US012791901B2

(12) United States Patent
Sun et al.

(10) Patent No.: US 12,791,901 B2
(45) Date of Patent: Nov. 10, 2026

(54) LIQUID CRYSTAL DISPLAY PANEL AND MANUFACTURING METHOD THEREOF, DISPLAY SUBSTRATE, AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Zhidan Sun, Beijing (CN); Yuheng Fu, Beijing (CN); Zhe Li, Beijing (CN); Zhengyuan Teng, Beijing (CN); Lan Xin, Beijing (CN); Chunyan Qin, Beijing (CN); Hui Guo, Beijing (CN)

(73) Assignees: Chongqing BOE Optoelectronics Technology Co., Ltd., Chongqing (CN); Beijing BOE Technology Development Co., Ltd., Beijing (CN)

( * ) Notice: Subject to any disclaimer, the term of this patent is extended or adjusted under 35 U.S.C. 154(b) by 189 days.

(21) Appl. No.: 18/698,527

(22) PCT Filed: Mar. 31, 2023

(86) PCT No.: PCT/CN2023/085599

§ 371 (c)(1),
(2) Date: Apr. 4, 2024

(87) PCT Pub. No.: WO2024/197854

PCT Pub. Date: Oct. 3, 2024

(65) Prior Publication Data

US 2025/0237915 A1 Jul. 24, 2025

(51) Int. Cl.
*G02F 1/1362* (2006.01)
*G02F 1/1343* (2006.01)

(52) U.S. Cl.
CPC .. *G02F 1/136286* (2013.01); *G02F 1/134309* (2013.01)

(58) Field of Classification Search
CPC ......... G02F 1/136286; G02F 1/134309; G02F 1/1345; G02F 1/1343
See application file for complete search history.

(56) References Cited

U.S. PATENT DOCUMENTS

2011/0003429 A1* 1/2011 Oikawa ............ H01L 21/02565 438/104
2011/0013106 A1 1/2011 Liu
(Continued)

FOREIGN PATENT DOCUMENTS

CN 101957530 A 1/2011
CN 102666785 A 9/2012
(Continued)

*Primary Examiner* — Mariam Qureshi
(74) *Attorney, Agent, or Firm* — The Webb Law Firm

(57) ABSTRACT

The present disclosure provides a liquid crystal display panel and a manufacturing method thereof, a display substrate, and a display device. The liquid crystal display panel includes a first base substrate including a display area and a peripheral area surrounding the display area; a common electrode line located at the peripheral area and configured to provide a common voltage; a common electrode connected to the common electrode line; and a metal line connected to the common electrode line and connected in parallel with the common electrode, wherein a sheet resistance of the metal line is less than a sheet resistance of the common electrode.

17 Claims, 12 Drawing Sheets

(56) References Cited

U.S. PATENT DOCUMENTS

| | | | | |
|---|---|---|---|---|
| 2012/0217438 | A1 | 8/2012 | Hattori et al. | |
| 2014/0015739 | A1 | 1/2014 | Tsao et al. | |
| 2017/0114277 | A1 | 4/2017 | Furusato et al. | |
| 2017/0186351 | A1 | 6/2017 | Um | |
| 2018/0364529 | A1* | 12/2018 | Ren | G02F 1/134363 |
| 2022/0189999 | A1* | 6/2022 | Hara | H10D 86/423 |
| 2023/0004054 | A1* | 1/2023 | Chen | G02F 1/133707 |
| 2023/0102616 | A1* | 3/2023 | Chen | H10K 59/1315 257/40 |
| 2023/0287272 | A1* | 9/2023 | Inoue | G02F 1/13756 |
| 2024/0194843 | A1* | 6/2024 | Shim | H10H 20/831 |

FOREIGN PATENT DOCUMENTS

| | | | |
|---|---|---|---|
| CN | 102902119 | A | 1/2013 |
| CN | 104834132 | A | 8/2015 |
| CN | 108779395 | A | 11/2018 |
| JP | H0836163 | A | 2/1996 |
| JP | 2001242476 | A | 9/2001 |
| JP | 2010237485 | A | 10/2010 |
| JP | 2011128635 | A | 6/2011 |
| JP | 2013254219 | A | 12/2013 |
| KR | 20010058152 | A | 7/2001 |
| KR | 1020130026375 | A | 3/2013 |
| WO | 2022202349 | A1 | 9/2022 |

* cited by examiner

LIQUID CRYSTAL DISPLAY PANEL AND MANUFACTURING METHOD THEREOF, DISPLAY SUBSTRATE, AND DISPLAY DEVICE

CROSS-REFERENCE TO RELATED APPLICATIONS

This application is the United States national phase of International Patent Application No. PCT/CN2023/085599, filed Mar. 31, 2023, the disclosure of which is hereby incorporated by reference in its entirety.

BACKGROUND OF THE INVENTION

Field of the Invention

The present disclosure relates to a liquid crystal display panel and a manufacturing method thereof, a display substrate, and a display device.

Description of Related Art

With the development of display technology, a user has higher and higher requirements for the display effect of a liquid crystal display panel.

In the related art, by increasing a refresh rate of the liquid crystal display panel, the definition and stability of the display image can be improved to reduce the adverse effect on the user's eyes.

SUMMARY OF THE INVENTION

According to an aspect of the embodiment of the present disclosure, provided is a liquid crystal display panel. The liquid crystal display panel comprises: a first base substrate comprising a display area and a peripheral area surrounding the display area; a common electrode line located at the peripheral area and configured to provide a common voltage; a common electrode connected to the common electrode line; and a metal line connected to the common electrode line and connected in parallel with the common electrode, wherein a sheet resistance of the metal line is less than a sheet resistance of the common electrode.

In some embodiments, the metal line is at least partially located at the display area.

In some embodiments, the liquid crystal display panel comprises a signal line, the signal line being one of a data line and a gate line; and the metal line comprises a first portion located at the display area, and the signal line comprises a second portion located at the display area, wherein an orthographic projection of the first portion on the first base substrate is located within an orthographic projection of the second portion on the first base substrate.

In some embodiments, the metal line further comprises a third portion located at the display area and connected to the first portion, and one area of a plurality of areas where orthographic projections of one data line and one gate line in the liquid crystal display panel on the first base substrate overlap is located within an orthographic projection of the third portion on the first base substrate.

In some embodiments, the liquid crystal display panel comprises a first group of metal lines and a second group of metal lines crossed with the first group of metal lines, and the first group of metal lines and the second group of metal lines each comprise a plurality of metal lines respectively.

In some embodiments, an orthographic projection of a first portion of each of the first group of metal lines located at the display area on the first base substrate is located within an orthographic projection of a second portion of a corresponding data line in the liquid crystal display panel located at the display area on the first base substrate; and an orthographic projection of a first portion of each of the second group of metal lines located at the display area on the first base substrate is located within an orthographic projection of a second portion of a corresponding gate line in the liquid crystal display panel located at the display area on the first base substrate.

In some embodiments, the plurality of metal lines in the first group of metal lines is in one-to-one correspondence with a plurality of data lines in the liquid crystal display panel; and the plurality of metal lines in the second group of metal lines is in one-to-one correspondence with a plurality of gate lines in the liquid crystal display panel.

In some embodiments, the metal line is in contact with the common electrode line.

In some embodiments, a surface of the metal line close to the common electrode is in contact with a surface of the common electrode close to the metal line.

In some embodiments, one of the metal line and the common electrode is located between the first base substrate and the other of the metal line and the common electrode.

In some embodiments, the sheet resistance of the metal line is greater than 0 and less than or equal to 0.075 Ω/□.

In some embodiments, a ratio of the sheet resistance of the common electrode to the sheet resistance of the metal line is greater than or equal to 500.

In some embodiments, an elastic constant of liquid crystal in the liquid crystal display panel at 50° C. is greater than or equal to 13.5.

In some embodiments, an elastic constant of liquid crystal in the liquid crystal display panel at 25° C. is greater than or equal to 17.

In some embodiments, the elastic constant is an average value of a splay elastic constant, a bend elastic constant and a twist elastic constant of the liquid crystal.

In some embodiments, the liquid crystal display panel further comprises: a pixel electrode, wherein a viscosity of a material of the pixel electrode is greater than 3 mPa·s and less than or equal to 5 mPa·s.

According to another aspect of the embodiments of the present disclosure, provided is a display substrate for a liquid crystal display panel, wherein the display substrate is one of an array substrate and a color film substrate. The display substrate comprises: a first base substrate comprising a display area and a peripheral area surrounding the display area; a common electrode line located at the peripheral area and configured to provide a common voltage; a common electrode connected to the common electrode line; and a metal line connected to the common electrode line and connected in parallel with the common electrode, wherein a sheet resistance of the metal line is less than a sheet resistance of the common electrode.

In some embodiments, the display substrate is the array substrate comprising a signal line, the signal line being one of a data line and a gate line; and the metal line comprises a first portion located at the display area, and the signal line comprises a second portion located at the display area, wherein an orthographic projection of the first portion on the first base substrate is located within an orthographic projection of the second portion on the first base substrate.

In some embodiments, the display substrate comprises a first group of metal lines and a second group of metal lines crossed with the first group of metal lines, and the first group of metal lines and the second group of metal lines each comprise a plurality of metal lines respectively.

In some embodiments, the display substrate is the array substrate, wherein: an orthographic projection of each of the first group of metal lines located at the display area on the first base substrate is located within an orthographic projection of a corresponding data line in the liquid crystal display panel located at the display area on the first base substrate; and an orthographic projection of each of the second group of metal lines located at the display area on the first base substrate is located within an orthographic projection of a corresponding gate line in the liquid crystal display panel located at the display area on the first base substrate.

In some embodiments, an orthographic projection of a first portion of each of the first group of metal lines located at the display area on the first base substrate is located within an orthographic projection of a second portion of a corresponding data line in the liquid crystal display panel located at the display area on the first base substrate; and an orthographic projection of a first portion of each of the second group of metal lines located at the display area on the first base substrate is located within an orthographic projection of a second portion of a corresponding gate line in the liquid crystal display panel located at the display area on the first base substrate.

In some embodiments, the display substrate is the array substrate, and a viscosity of a material of a pixel electrode in the array substrate is greater than 3 mPa·s and less than or equal to 5 mPa·s.

According to still another aspect of the embodiments of the present disclosure, provided is a display device. The display device comprises: the liquid crystal display panel according to any of the above embodiments; or the display substrate for a liquid crystal display panel any of the above embodiments.

According to yet still another aspect of the embodiments of the present disclosure, provided is a manufacturing method of a liquid crystal display panel. The manufacturing method comprises: providing a first base substrate, wherein the first base substrate comprises a display area and a peripheral area surrounding the display area; forming a common electrode line located at the peripheral area, wherein the common electrode line is configured to provide a common voltage; and forming a common electrode and a metal line which are connected to the common electrode line respectively, wherein the metal line is connected in parallel with the common electrode, and a sheet resistance of the metal line is less than a sheet resistance of the common electrode.

In some embodiments, the manufacturing method further comprises: forming a first insulating layer in contact with the common electrode on one side of the common electrode away from the first base substrate, wherein a pressure applied during a process of forming the first insulating layer is greater than or equal to 1.2 torr and less than 1.5 torr; and forming a pixel electrode in contact with the first insulating layer on one side of the first insulating layer away from the first base substrate.

In some embodiments, the manufacturing method further comprises forming a pixel electrode, wherein a viscosity of a material of the pixel electrode is greater than 3 mPa·s and less than or equal to 5 mPa·s.

In some embodiments, forming the pixel electrode comprises forming a pixel electrode material layer; and etching the pixel electrode material layer with an etching solution to form the pixel electrode, wherein a service life of the etching solution is greater than 0 and less than or equal to 5000 mins.

In some embodiments, a duration of the etching is greater than or equal to 160 seconds and less than or equal to 180 seconds.

In some embodiments, the manufacturing method further comprises forming a pixel driving circuit comprising a driving transistor, wherein forming the driving transistor comprises: forming a gate of the driving transistor; forming an electrode material layer; aligning a mask plate by using each alignment mark of the mask plate; and patterning, after the aligning, the electrode material layer by using the mask plate to form a source and a drain of the driving transistor.

According to a further aspect of the embodiments of the present disclosure, provided is a liquid crystal display panel. The liquid crystal display panel comprises: a first base substrate comprising a display area and a peripheral area surrounding the display area; a common electrode line located at the peripheral area and configured to provide a common voltage; and a common electrode connected to the common electrode line, wherein the liquid crystal display panel satisfies at least one of a first condition, a second condition or a third condition. The first condition comprises: the liquid crystal display panel comprises a metal line, wherein the metal line is connected to the common electrode wire and connected in parallel with the common electrode, and a sheet resistance of the metal line is less than a sheet resistance of the common electrode; the second condition comprises: an elastic constant of liquid crystal in the liquid crystal display panel at 50° C. is greater than or equal to 13.5; and the third condition comprises: a viscosity of a material of a pixel electrode in the liquid crystal display panel is greater than 3 mPa·s and less than or equal to 5 mPa·s.

BRIEF DESCRIPTION OF THE DRAWINGS

The accompanying drawings which constitute a part of this specification, describe the embodiments of the present disclosure, and together with this specification, serve to explain the principles of the present disclosure.

The present disclosure may be more explicitly understood from the following detailed description with reference to the accompanying drawings, in which.

It should be appreciated that, the same or similar reference numerals refer to the same or similar components.

DESCRIPTION OF THE INVENTION

Figure 1:
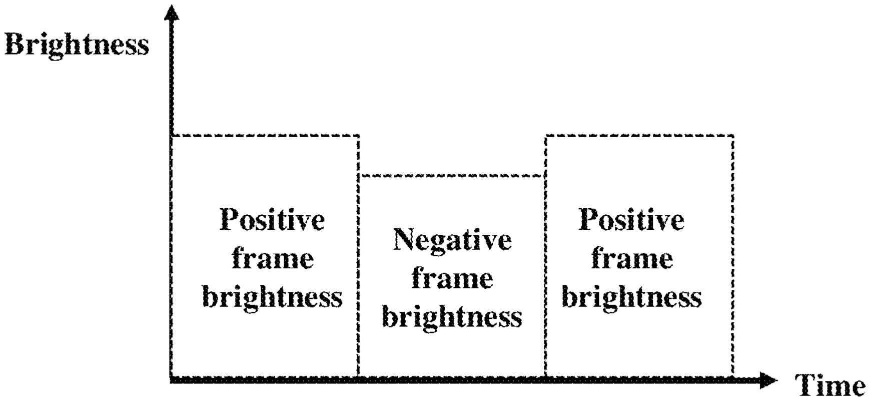
FIG. 1 is a schematic view showing brightness change of a positive frame and a negative frame of a liquid crystal display panel.

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity, or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The lower the refresh rate of the liquid crystal display panel is, the poorer the display effect will be. Specifically, the lower the refresh rate is, the more serious the flicker phenomenon of the display image of the liquid crystal display panel will be, which is likely to cause unpleasant experiences of a user such as visual fatigue or dizziness.

The inventors have noticed that, although the manner in the related art can enhance the display effect of the liquid crystal display panel by increasing the screen refresh rate, this will lead to increased power consumption of the liquid crystal display panel, thereby affecting the service life of the liquid crystal display panel.

In view of the above, the embodiments of the present disclosure provide the following technical solutions, which can incorporate the display effect and power consumption of the liquid crystal display panel, thereby enhancing the display effect of the liquid crystal display panel on the premise of a low power consumption.

FIG. 1 is a schematic view showing brightness change of a positive frame and a negative frame of a liquid crystal display panel.

As shown in FIG. 1, the pixel voltage of the positive frame is different from that of the negative frame, which results in that the brightness of the display screen of the positive frame is different from the brightness of the display screen of the negative frame, and alternating light-and-dark change will cause flicker. For example, the flicker may be equal to a ratio between a brightness difference between adjacent positive and negative frames and an average brightness of the liquid crystal display panel.

The inventors have found through analysis that, the common voltage applied to the common electrode might deviate from an expected value, and if the common voltage is more stable or more easily to rebound to the expected value, it will help to alleviate the flicker problem of the liquid crystal display panel. In view showing this, the embodiments of the present disclosure provide the following technical solutions.

Figure 2A:
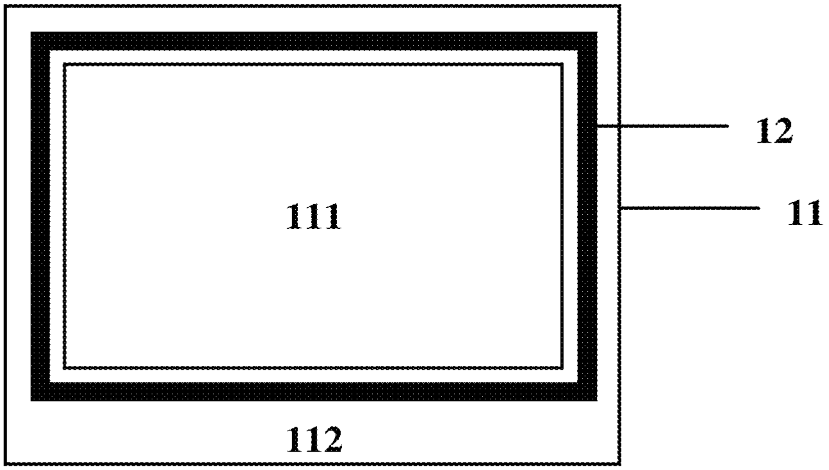
FIGS. 2A and 2B are schematic structural views showing a liquid crystal display panel according to some embodiments of the present disclosure.
Figure 2B:
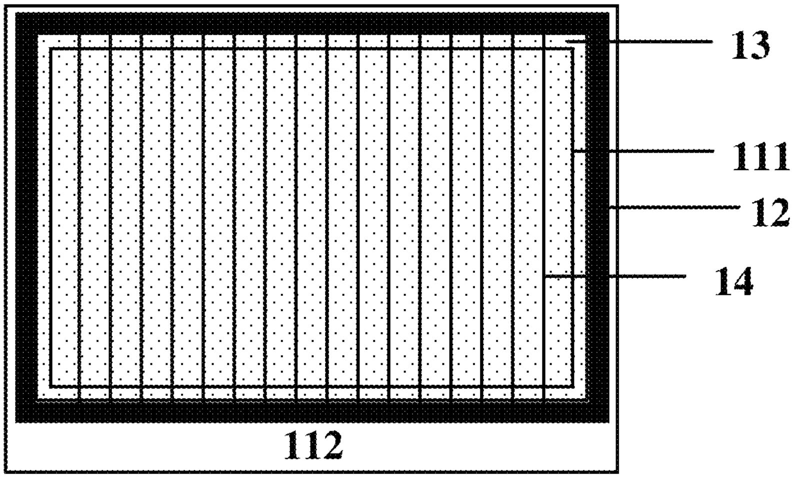

FIGS. 2A and 2B are schematic structural views showing a liquid crystal display panel according to some embodiments of the present disclosure.

As shown in FIGS. 2A and 2B, the liquid crystal display panel comprises a first base substrate 11, a common electrode line 12, a common electrode 13 and a metal line 14.

In some embodiments, the first base substrate 11, the common electrode line 12, the common electrode 13 and the metal line 14 are located in the array substrate of the liquid crystal display panel. In other embodiments, the first base substrate 11, the common electrode line 12, the common electrode 13 and the metal line 14 are located in the color film substrate of the liquid crystal display panel.

First, the first base substrate 11 and the common electrode line 12 will be described in conjunction with FIG. 2A.

Referring to FIG. 2A, the first base substrate 11 comprises a display area 111 and a peripheral area 112 surrounding the display area 111. For example, the first base substrate 11 is a glass substrate. It is to be noted that, although the display area 111 shown in FIGS. 2A and 2B is rectangular, this is not restrictive. In some embodiments, the corner of the display area 111 may have a radian, such as a circular arc shape.

Referring to FIG. 2A, the common electrode line 12 is located at the peripheral area 112 and configured to provide a common voltage to the common electrode 13. In some embodiments, the material of the common electrode line 12 comprises metal. For example, the material of the common electrode line 12 is the same as that of a gate line in the liquid crystal display panel; and in this case, the common electrode line 12 and the gate line may be formed by a same patterning process. For another example, the material of the common electrode line 12 is the same as that of a data line in the liquid crystal display panel; and in this case, the common electrode line 12 and the data line may be formed by a same patterning process. Here, the expression of by the same patterning process refers to patterning a same material layer.

Next, the common electrode 13 and the metal line 14 will be introduced in conjunction with FIG. 2B.

Referring to FIG. 2B, the common electrode 13 is connected to the common electrode line 12. As some implementations, the common electrode 13 is in contact with the common electrode line 12. For example, the common electrode 13 is a surface electrode, and an edge portion of the common electrode 13 is in contact with the common electrode line 12.

Referring to FIG. 2B, the metal line 14 is connected to the common electrode line 12 and the metal line 14 is connected in parallel with the common electrode 13. Here, the sheet resistance of the metal line 14 is less than that of the common electrode 13. As some implementations, the metal line 14 is in contact with the common electrode line 12. The number of metal lines 14 may be one or more than one. In some embodiments, the liquid crystal display panel comprises a plurality of metal lines 14 spaced apart from each other.

In the above embodiments, the liquid crystal display panel comprises the metal line 14 connected to the common electrode line 12 and connected in parallel with the common electrode 13, and the sheet resistance of the common electrode 13 and the parallel metal line 14 as a whole is less than that of the common electrode 13, thereby reducing the sheet resistance of the wiring of the common voltage. With this structure, on one hand, it is not easy for the common voltage to deviate from an expected value; on the other hand, even if the common voltage deviates from the expected value, it is also easier for the common voltage to rebound to the expected value. In this way, it is helpful to improve the stability and rebound resilience of the common voltage, thereby alleviating the flicker problem of the liquid crystal display panel to enhance the display effect of the liquid crystal display panel.

Some embodiments in which the display effect of the liquid crystal display panel can be further improved will be introduced below.

In some embodiments, the sheet resistance of the metal line 14 is less than or equal to 0.075Ω/□. For example, the sheet resistance of the structure in which the metal line 14 and the common electrode 13 are connected in parallel is 0.0749Ω/□.

In other embodiments, the ratio of the sheet resistance of the common electrode 13 to that of the metal line 14 is greater than or equal to 500. For example, the ratio of the sheet resistance of the common electrode 13 to that of the metal line 14 is greater than or equal to 520; for another example, the ratio of the sheet resistance of the common electrode 13 to that of the metal line 14 is greater than or equal to 530, for example, the ratio is 533, 535, 550, or the like.

With the structure of the above embodiments, it is helpful to further improve the stability and rebound resilience of the common voltage, thereby further alleviating the flicker problem of the liquid crystal display panel to further enhance the display effect of the liquid crystal display panel.

In some embodiments, the metal line 14 is at least partially located at the display area 111. For example, a part of the metal line 14 is located at the display area 111, and the other part is located at the peripheral area 112. In this way, it is helpful to improve the display uniformity of the liquid crystal display panel on the basis of alleviating the flicker problem of the liquid crystal display panel, to further enhance the display effect of the liquid crystal display panel.

In addition, to reduce the influence of the metal line 14 on the pixel aperture ratio of the liquid crystal display panel, the embodiments of the present disclosure also provide the following technical solutions.

Figure 3A:
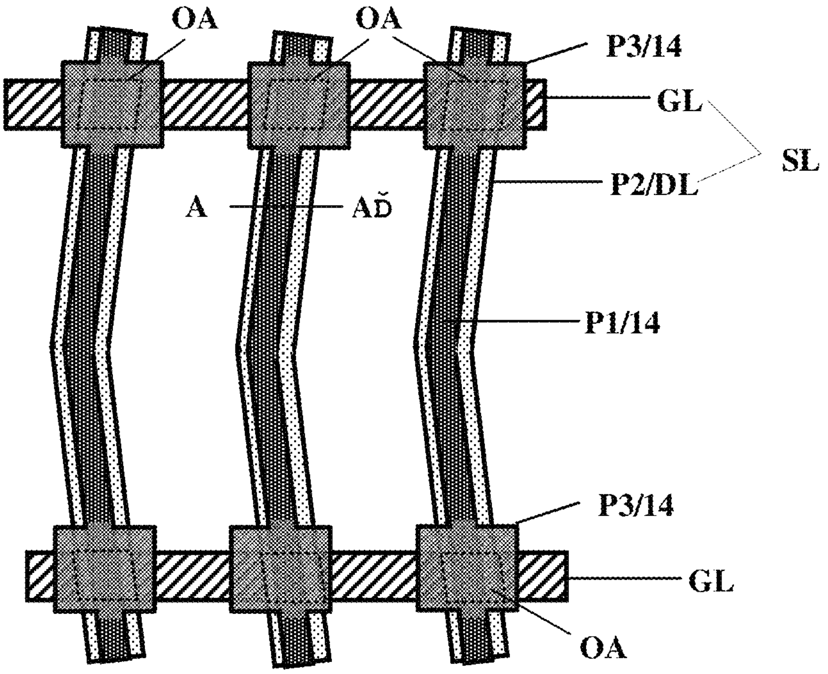
FIGS. 3A and 3B are schematic views showing a signal line and a metal line according to some embodiments of the present disclosure.
Figure 3B:
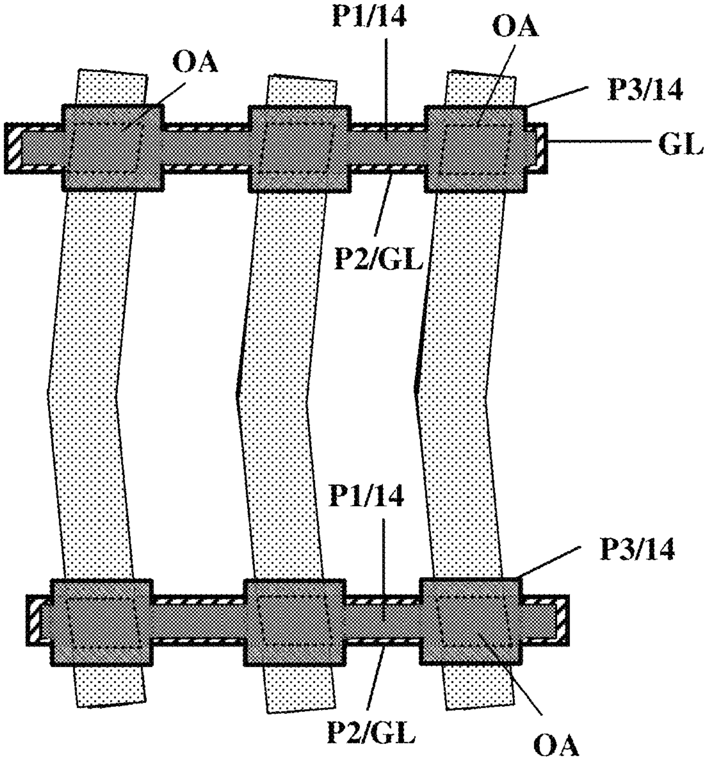

FIGS. 3A and 3B are schematic views showing a signal line and a metal line according to some embodiments of the present disclosure.

The liquid crystal display panel comprises a signal line SL configured to provide a signal to a sub-pixel in the liquid crystal display panel. As some implementations, the signal line SL is one of a data line DL and a gate line GL.

As shown in FIG. 3A, the signal line SL is a data line DL which is configured to provide a data signal to a sub-pixel in the liquid crystal display panel; and as shown in FIG. 3B, the signal line SL is a gate line GL configured to provide a gate signal to a sub-pixel in the liquid crystal display panel.

In some embodiments, referring to FIGS. 3A and 3B, the metal line 14 comprises a first portion P1 located at the display area 111, and the signal line SL comprises a second portion P2 located at the display area 111. In some embodiments, the orthographic projection of the first portion P1 on the first base substrate 11 at least partially overlaps with the orthographic projection of the second portion P2 on the first base substrate. As some implementations, the orthographic projection of the first portion P1 on the first base substrate 11 is located within the orthographic projection of the second portion P2 on the first base substrate.

FIG. 3A shows a case where the orthographic projection of the first portion P1 of the metal line 14 on the first base substrate 11 is located within the orthographic projection of the second portion P2 of the data line DL on the first base substrate, and FIG. 3B shows a case where the orthographic projection of the first portion P1 of the metal line 14 on the first base substrate 11 is located within the orthographic projection of the second portion P2 of the gate line GL on the first base substrate. In this way, the first portion P1 of the metal line 14 does not need to occupy additional space in the display area 111, which at least reduces the adverse effect on the pixel aperture ratio and transmittance of the liquid crystal display panel, thereby enhancing the display effect of the liquid crystal display panel without affecting the pixel aperture ratio and transmittance as much as possible.

For example, the edge of the orthographic projection of the first portion P1 of the metal line 14 on the first base substrate 11 completely overlaps with the edge of the orthographic projection of the second portion P2 of the signal line SL on the first base substrate 11; and for another example, the area of the orthogonal projection of the metal line 14 on the first base substrate 11 is less than the area of the orthogonal projection of the second portion P2 of the signal line SL on the first base substrate 11. As examples, the line width (which may be understood as the size of the data line DL in a direction perpendicular to an extension direction of the data line DL) of the data line DL is about 4 microns, and the line width of the first portion P1 of the metal line 14 is less than 4 microns.

In some embodiments, referring to FIGS. 3A and 3B, the metal line 14 further comprises a third portion P3 located at the display area 111 and connected to the first portion P1, and one area OA of where the orthographic projections of one data line DL and one gate line GL in the liquid crystal display panel on the first base substrate 11 overlap is located within the orthographic projection of the third portion P3 on the first base substrate. It should be understood that there are a plurality of areas OA where the orthographic projections of data lines DL and gate lines GL in the liquid crystal display panel on the first base substrate 11 overlap.

For example, as shown in FIG. 3A, in one metal line 14, the first portion P1 is located between two adjacent third portions P3, and the orthographic projection of the first portion P1 on the first base substrate 11 does not overlap with the orthographic projection of the gate line GL on the first base substrate 11.

For example, as shown in FIG. 3B, in one metal line 14, the first portion P1 is located between two adjacent third portions P3, and the orthographic projection of the first portion P1 on the first base substrate 11 does not overlap with the orthographic projection of the data line GL on the first base substrate 11.

In some embodiments, the length of the first portion P1 in an extension direction of the metal line 14 is greater than the length of the third portion P3 in the extension direction of the metal line 14. For example, in one metal line 14, the sum of the lengths of all the first portions P1 in the extension direction of the metal line 14 is greater than the sum of the lengths of all the third portions P3 in the extension direction of the metal line 14. In other words, most part of the orthographic projection of the metal line 14 on the first base substrate 11 is located within the orthographic projection of the signal line SL on the first base substrate 11, and only a small part of the orthographic projection of the metal line 14 on the first base substrate 11 is located beyond the orthographic projection of the signal line SL on the first base substrate 11. In this way, the space occupied by the metal lines 14 in the display area 111 can be reduced as much as possible.

In some embodiments, the orthographic projection of a portion of the metal line 14 located at the peripheral area 112 on the first base substrate 11 is located within the orthographic projection of a portion of the signal line SL located at the peripheral area 112 on the first base substrate 11. In this way, the portion of the metal line 14 located at the peripheral area 112 does not need to occupy the space of the peripheral area 112, thereby further reducing the adverse effect of the metal line 14 on the liquid crystal display panel.

Figure 4A:
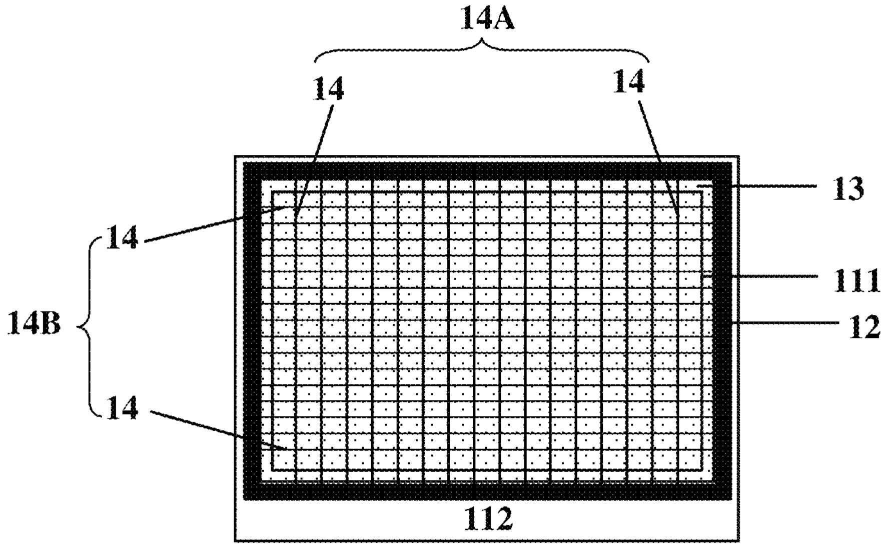
FIGS. 4A and 4B are schematic structural views showing a liquid crystal display panel according to other embodiments of the present disclosure.
Figure 4B:
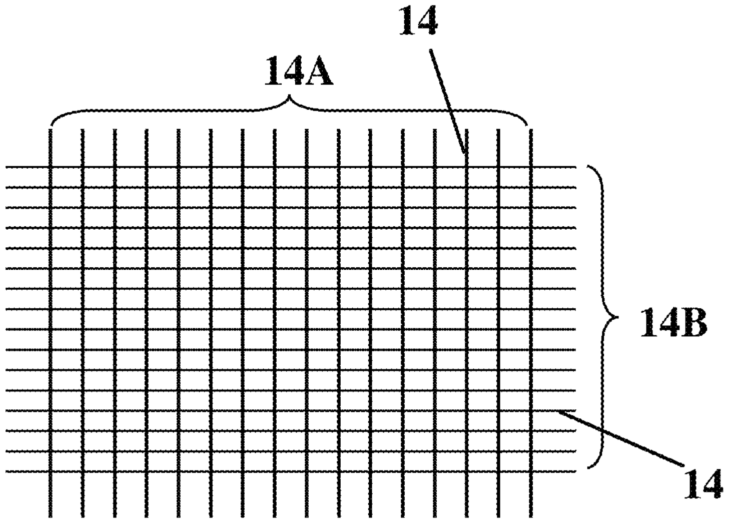

FIGS. 4A and 4B are schematic structural views showing a liquid crystal display panel according to other embodiments of the present disclosure. It is to be noted that, to make it clearer, FIG. 4B only focuses on showing the signal line 14.

As shown in FIGS. 4A and 4B, in some embodiments, the liquid crystal display panel comprises a first group of metal lines 14A and a second group of metal lines 14B crossed with the first group of metal lines 14A, and the first group of metal lines 14A and the second group of metal lines 14B each comprise a plurality of metal lines 14 respectively. For the positional relationship and connection relationship between each metal line 14 among each group of metal lines and other members, reference may be made to the above description, which will not be described in detail here.

As some implementations, each metal line 14 among the first group of metal lines 14A and any metal line 14 among the second group of metal lines 14B are crossed and integrally provided, and each metal line 14 among the second group of metal lines 14B and any metal line 14 among the first group of metal lines 14A are crossed and integrally provided.

As some implementations, the extension direction of the first group of metal lines 14A is perpendicular to that of the first group of metal lines 14B. For example, the extension direction of the first group of metal lines 14A is the same as that of the data line DL;

and the extension direction of the second group of metal lines 14B is the same as that of the gate line GL.

In the above embodiments, the liquid crystal display panel comprises a plurality of groups of metal lines crossed with each other, and each metal line among each group of metal lines is connected to the common electrode line 12 and connected in parallel with the common electrode 13. Such a mesh structure is helpful to further reduce the sheet resistance of the wiring of the common voltage, thereby further alleviating the flicker problem of the liquid crystal display panel to enhance the display effect of the liquid crystal display panel.

Figure 5:
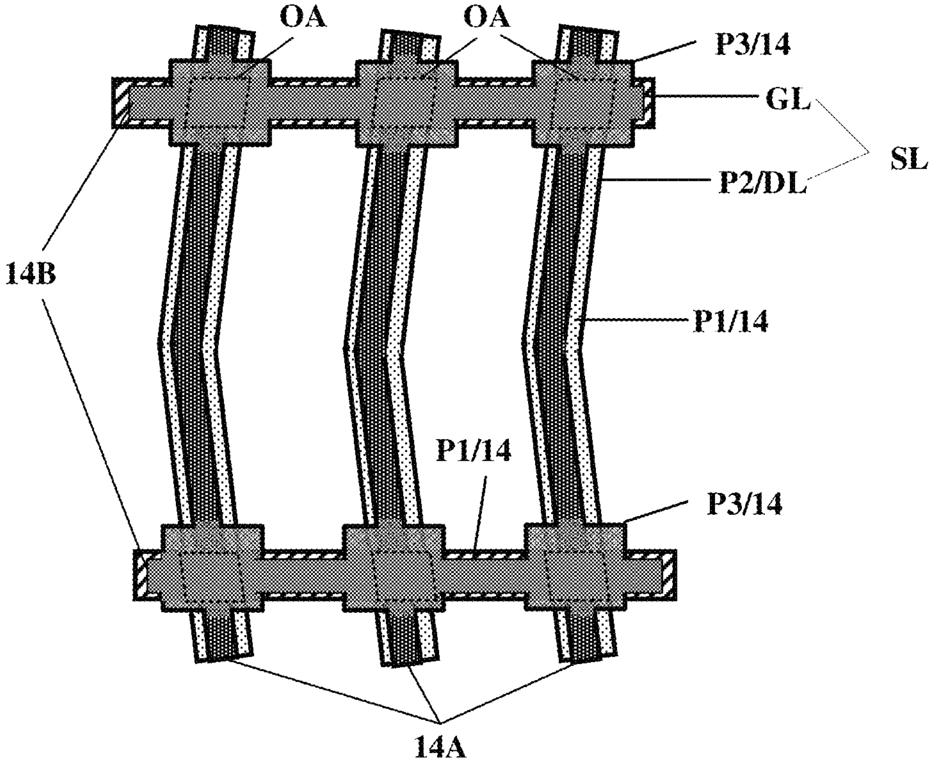
FIG. 5 is a schematic view showing a signal line and a metal line according to other embodiments of the present disclosure.

FIG. 5 is a schematic view showing a signal line and a metal line according to other embodiments of the present disclosure.

As shown in FIG. 5, the orthographic projection of the first portion P1 of each metal line 14 among the first group of metal lines 14A located at the display area 111 on the first base substrate 11 is located within the orthographic projection of the second portion P2 of a corresponding data line DL in the liquid crystal display panel located at the display area 111 on the first base substrate 11. The orthographic projection of the first portion P1 of each metal line 14 among the second group of metal lines 14B located at the display area 111 on the first base substrate 11 is located within the orthographic projection of the second portion P2 of a corresponding gate line GL in the liquid crystal display panel located at the display area 111 on the first base substrate 11.

In this way, the first portion P1 of the metal line 14 among each group of metal lines located at the display area 111 does not need to occupy the space of the display area 111, thereby further reducing the adverse effect of the metal line 14 on the liquid crystal display panel.

In some embodiments, the metal line 14 among each group of metal lines further comprises a third portion P3. For example, the third portion P3 of a metal line 14 among the first group of metal lines 14A may be multiplexed as the third portion P3 of a metal line 14 among the second group of metal lines 14B.

In some embodiments, the plurality of metal lines 14 among the first group of metal lines 14A is in one-to-one correspondence with the plurality of data lines DL in the liquid crystal display panel. In other words, the number of metal lines 14 among the first group of metal lines 14A is the same as the number of data lines DL in the liquid crystal display panel. In this way, the metal lines 14 not needing to occupy other space can be arranged by using the data lines DL in the liquid crystal display panel, thereby effectively reducing the adverse effect of the metal line 14 on the liquid crystal display panel.

In other embodiments, the plurality of metal lines 14 among the second group of metal lines 14B is in one-to-one correspondence with the plurality of gate lines GL in the liquid crystal display panel. In other words, the number of metal lines 14 among the second group of metal lines 14B is the same as the number of gate lines GL in the liquid crystal display panel. In this way, the metal lines 14 not needing to occupy other space can be arranged by using the gate lines GL in the liquid crystal display panel metal lines 14, thereby effectively reducing the adverse effects of the metal line 14 on the liquid crystal display panel.

In still other embodiments, the plurality of metal lines 14 among the first group of metal lines 14A is in one-to-one correspondence with the plurality of data lines DL in the liquid crystal display panel, and the plurality of metal lines 14 among the second group of metal lines 14B is in one-to-one correspondence with the plurality of gate lines GL in the liquid crystal display panel. In this way, the metal lines 14 not needing to occupy other space can be arranged by using the data lines DL and the gate lines GL in the liquid crystal display panel, thereby effectively reducing the adverse effect of the metal line 14 on the liquid crystal display panel.

In some embodiments, the liquid crystal display panel comprises one group of metal lines of the first group of metal lines 14A and the second group of metal lines 14B. For example, the liquid crystal display panel comprises only the first group of metal lines 14A; for another example, the liquid crystal display panel comprises only the second group of metal lines 14B. In other embodiments, the liquid crystal display panel comprises the first group of metal lines 14A and the second group of metal lines 14B.

In the following, some implementations of the material of the metal line 14 will be introduced in conjunction with some embodiments.

In some embodiments, the material of the metal line 14 is the same as that of the signal line SL. For example, the material of the metal line 14 is the same as that of the data line DL; for another example, the material of the metal line 14 is the same as that of the gate line GL; for another example, the materials of some metal lines 14 is the same as that of the data line DL, and the materials of other metal lines 14 is the same as that of the gate line GL.

In some embodiments, the material of the metal line 14 is different from that of the common electrode 13. For example, the material of the common electrode 13 is indium tin oxide (ITO); for example, the material of the metal line 14 is copper or aluminum.

Figure 6A:
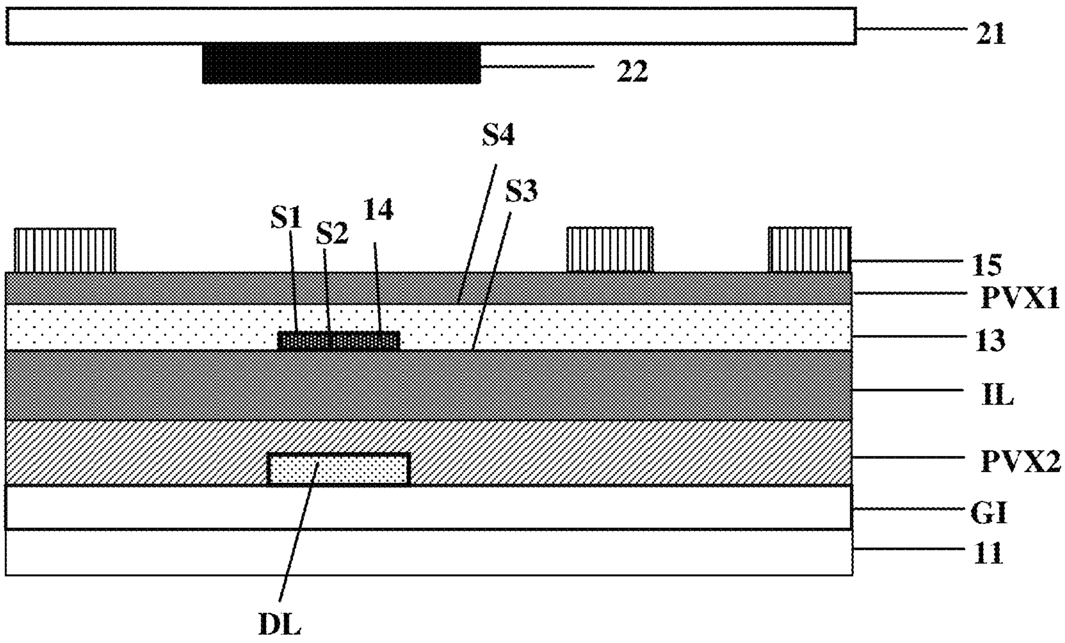
FIGS. 6A and 6B are schematic cross-sectional views taken along A-A' shown in FIG. 3.
Figure 6B:
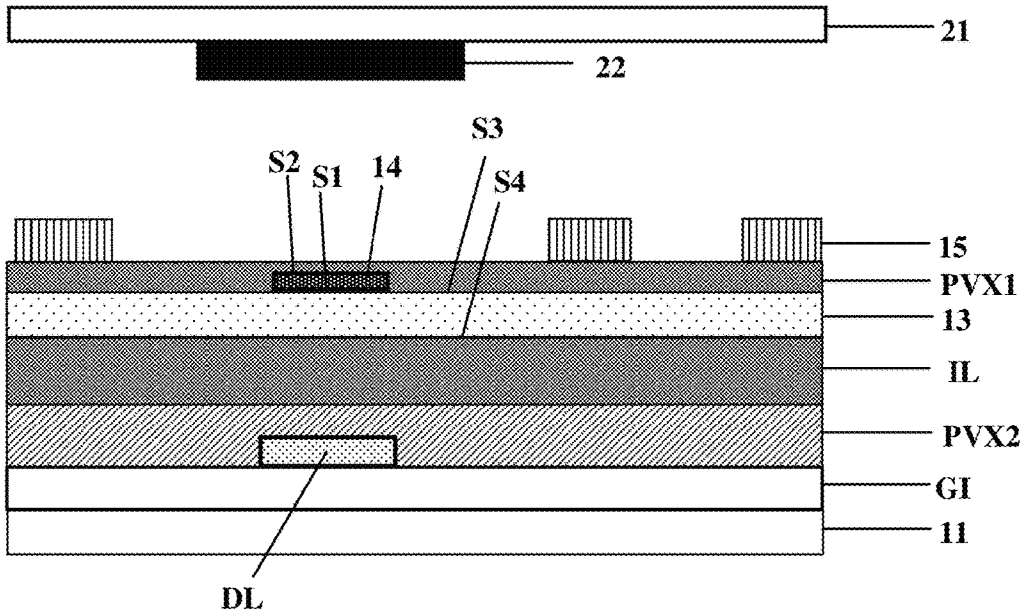

FIGS. 6A and 6B are schematic cross-sectional views taken along A-A' shown in FIG. 3.

In FIGS. 6A and 6B, a first insulating layer PVX1 is provided between the common electrode 13 and the pixel electrode 15. As some implementations, the first insulating layer PVX1 is an inorganic insulating layer. For example, the material of the first insulating layer PVX1 comprises an inorganic material such as silicon nitride (for example, SiNx). In some embodiments, the viscosity of the material of the pixel electrode 15 is greater than 3 mPa·s and less than or equal to 5 mPa·s.

A second insulating layer PVX2 and a third insulating layer IL are provided between the common electrode 13 and the data line DL, the second insulating layer PVX2 covers the data line DL, and the third insulating layer IL is located between the second insulating layer PVX2 and the common electrode 13. As some implementations, the second insulating layer PVX2 is an inorganic insulating layer; for example, the material of the second insulating layer PVX1 comprises an inorganic material such as silicon oxide (for example, SiOx). As some implementations, the third insulating layer IL is an organic insulating layer; for example, the material of the third insulating layer IL comprises an organic material such as organic polymers.

A fourth insulating layer GI is provided between the data line DL and the first base substrate 11. For example, the material of the fourth insulating layer GI comprises silicon nitride, silicon oxide or silicon oxynitride.

It should be understood that, other layers, such as a buffer layer, may be provided between the first base substrate 11 and the fourth insulating layer GI.

FIGS. 6A and 6B also schematically show a second base substrate 21 and a black matrix 22. For example, the second base substrate 21 is a glass substrate.

Next, the connection method and positional relationship between the metal line 14 and the common electrode 13 will be described in conjunction with FIGS. 6A and 6B.

First, the connection method between the metal line 14 and the common electrode 13 will be introduced.

In some embodiments, an insulating layer (not shown) is provided between the metal line 14 and the common electrode 13, and an end of the metal line 14 is connected to (for example, in contact with) the common electrode 13, thereby realizing parallel connection between the metal line 14 and the common electrode 1312.

In other embodiments, as shown in FIGS. 6A and 6B, the metal line 14 has a surface S1 close to the common electrode 13 and a surface S2 away from the common electrode 13, the common electrode 13 has a surface S3 close to the metal line 14 and a surface S4 away from the metal line 14, and the surface S1 of the metal line 14 close to the common electrode 13 is in contact with the surface S3 of the common electrode 13 close to the metal line 14. In this way, the parallel connection between the metal line 14 and the common electrode 1312 is realized. It can be understood that in a case where materials and sheet resistances of the metal line 14 and the common electrode 13 are different, most of signal of the common voltage provided by the common electrode line 12 to the metal line 14 flows to a branch where the metal line 14 is located, and a small part of the signal flows to a branch where the common electrode 13 is located. Similarly, most of signal of the common voltage provided by the common electrode line 12 to the common electrode 13 flows to a branch where the common electrode 13 is located, and a small part of the signal flows to a branch where the metal line 14 is located.

Next, the positional relationship between the metal line 14 and the common electrode 13 will be introduced.

As shown in FIGS. 6A and 6B, one of the metal line 14 and the common electrode 13 is located between the first base substrate 11 and the other of the metal line 14 and the common electrode 13.

As some implementations, referring to FIG. 6A, the metal line 14 is located between the common electrode 13 and the first base substrate 11. For example, the metal line 14 is located on a surface of the third insulating layer IL, and the common electrode 13 covers the metal line 14.

As some implementations, referring to FIG. 6B, the common electrode 13 is located between the metal line 14 and the first base substrate 11. For example, the common electrode 13 is located on a surface of the third insulating layer IL, and the metal line 14 is located on a surface of the common electrode 13.

In some embodiments, the third insulating layer IL is an organic insulating layer, the common electrode 13 is located on a surface of the third insulating layer IL, and the metal line 14 is located on a surface of the common electrode 13. In this way, compared with the metal line 14 located on the surface of the third insulating layer IL, there is a greater bonding force between the metal line 14 and the common electrode 13, so that it is not easy for the position of the metal line 14 to change, thereby effectively avoiding adverse effect from possible movement of the metal line 14.

Alleviating the flicker problem of the liquid crystal display panel by using the metal line 14 to enhance the display effect of the liquid crystal display panel has been introduced above in conjunction with different embodiments.

Next, the technical solutions of alleviating the flicker problem of the liquid crystal display panel according to other embodiments of the present disclosure will be introduced.

The elastic constant of a liquid crystal determines the magnitude of recovery torque after the liquid crystal undergoes deformation from equilibrium state to disturbance. The inventors have noticed that, in a case of a higher temperature (for example, 50° C.), the elastic constant of liquid crystal decreases, which results in reduced rigidity and lowered restorability of liquid crystal.

Figure 7:
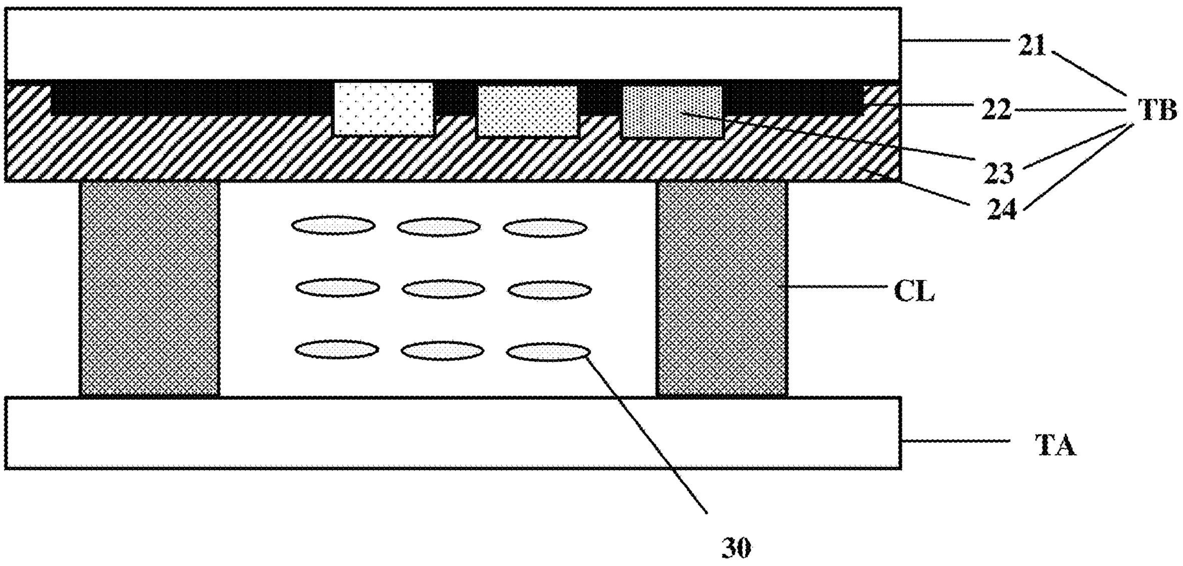
FIG. 7 is a schematic view showing the structure of a liquid crystal display panel according to still other embodiments of the present disclosure.

FIG. 7 is a schematic view showing the structure of a liquid crystal display panel according to still other embodiments of the present disclosure.

As shown in FIG. 7, the liquid crystal display panel comprises an array substrate TA, a color film substrate TB, and liquid crystal 30 located between the color film substrate TB and the array substrates TA. The array substrate TA and the color film substrate TB may be bonded by a frame sealant CL. It is to be noted that, FIG. 7 only schematically shows a black matrix 22, an optical filter 23 and an optical adhesive 24 in the color film substrate TB, and the color film substrate TB may also comprise other members, such as a polarizer.

In some embodiments, the elastic constant of the liquid crystal 30 in the liquid crystal display panel at 50° C. is greater than or equal to 13.5, for example, is 15, 18, 20, etc. In this way, the rigidity of liquid crystal is increased, the retention rate of the liquid crystal voltage is increased, and the fluctuation of the transmittance caused by liquid crystal molecular vibration is reduced (that is, the brightness difference is reduced) when switching between positive and negative frames, thereby alleviating the flicker problem of the liquid crystal display panel.

In other embodiments, the elastic constant of the liquid crystal 30 in the liquid crystal display panel at 25° C. is greater than or equal to 17, for example, is 20, 25, 30, etc. In this way, the rigidity of liquid crystal is increased, and the fluctuation of the transmittance caused by liquid crystal molecular vibration is reduced when switching between positive and negative frames, thereby alleviating the flicker problem of the liquid crystal display panel.

In still other embodiments, the elastic constant of the liquid crystal 30 in the liquid crystal display panel at 50° C. is greater than or equal to 13.5, and the elastic constant of the liquid crystal in the liquid crystal display panel at 25° C. is greater than or equal to 17. In this way, the rigidity of liquid crystal is further increased, and the fluctuation of the transmittance caused by liquid crystal molecular vibration is further reduced when switching between positive and negative frames, thereby further alleviating the flicker problem of the liquid crystal display panel.

In some implementations, the above elastic constant is an average value of a splay elastic constant, a bend elastic constant and a twist elastic constant of the liquid crystal 30. In this way, the elastic constant of liquid crystal under different deformations is effectively increased, thereby further effectively alleviating the flicker problem of the liquid crystal display panel.

The embodiments of the disclosure also provide a display substrate for a liquid crystal display panel. Here, the display substrate is one of an array substrate and a color film substrate. For example, the display substrate is an array substrate; for another example, the display substrate is a color film substrate.

Referring to FIGS. 2A and 2B, the display substrate comprises: a first base substrate 11, a common electrode line 12, a common electrode 13 and a metal line 14. For these members, reference may be made to the above description, which will not be described in detail here. In a case where the display substrate comprises the metal line 14 connected to the common electrode line 12 and connected in parallel with the common electrode 13, the sheet resistance of the common electrode 13 and the parallel metal line 14 as a whole is less than that of the common electrode 13, thereby reducing the sheet resistance of the wiring of the common voltage. With this structure, on one hand, it is not easy for the common voltage to deviate from an expected value; on the other hand, even if the common voltage deviates from the expected value, it is also easier for the common voltage to rebound to the expected value. In this way, it is helpful to improve the stability and rebound resilience of the common voltage, thereby alleviating the flicker problem of the liquid crystal display panel to enhance the display effect of the liquid crystal display panel.

In some embodiments, referring to FIGS. 3A and 3B, the display substrate is an array substrate which comprises a signal line SL. The signal line SL is one of a data line DL and a gate line GL. The metal line 14 comprises a first portion P1 located at the display area 111, and the signal line SL comprises a second portion P2 located at the display area 111. The orthographic projection of the first portion P1 on the first base substrate 11 is located within the orthographic projection of the second portion P2 on the first base substrate. In this way, the first portion P1 of the metal line 14 in the array substrate does not need to occupy additional space in the display area 111, which at least reduces the adverse effect on the pixel aperture ratio and transmittance of the liquid crystal display panel, thereby enhancing the display effect of the liquid crystal display panel without affecting the pixel aperture ratio and transmittance as much as possible.

In some embodiments, referring to FIGS. 4A and 4B, the display substrate comprises a first group of metal lines 14A and a second group of metal lines 14B crossed with the first group of metal lines 14A, and the first group of metal lines 14A and the second group of metal lines 14B each comprise a plurality of metal lines 14 respectively. In this case, the display substrate may be an array substrate or a color film substrate.

In some embodiments, referring to FIG. 5, the display substrate is an array substrate comprising a data line DL and a gate line GL. The orthographic projection of the first portion P1 of each metal line 14 among the first group of metal lines 14A located at the display area 111 on the first base substrate 11 is located within the orthographic projection of the second portion P2 of a corresponding data line DL in the array substrate located at the display area 111 on the first base substrate 11, and the orthographic projection of the first portion P1 of each metal line 14 among the second group of metal lines 14B located at the display area 111 on the first base substrate 11 is located within the orthographic projection of the second portion P2 of a corresponding gate line GL in the array substrate located at the display area 111 on the first base substrate 11. In this way, the first portion P1 of the metal line 14 among each group of metal lines does not need to occupy the space of the display area 111, thereby further reducing the adverse effect of the metal line 14 on the liquid crystal display panel.

In some embodiments, the display substrate is an array substrate, and the viscosity of the material of the pixel electrode in the array substrate is greater than 3 mPa·s and less than or equal to 5 mPa·s.

For other embodiments of the display substrate, reference may be made to the above description of the liquid crystal display panel, which will not be described in detail here.

The inventors have also found that, the flicker problem of the liquid crystal display panel can also be alleviated by controlling the precision of parameters of some member(s) during the manufacturing process of the liquid crystal display panel/display substrate. Description will be made below in conjunction with the manufacturing method of a liquid crystal display panel and a display substrate.

Figure 8:
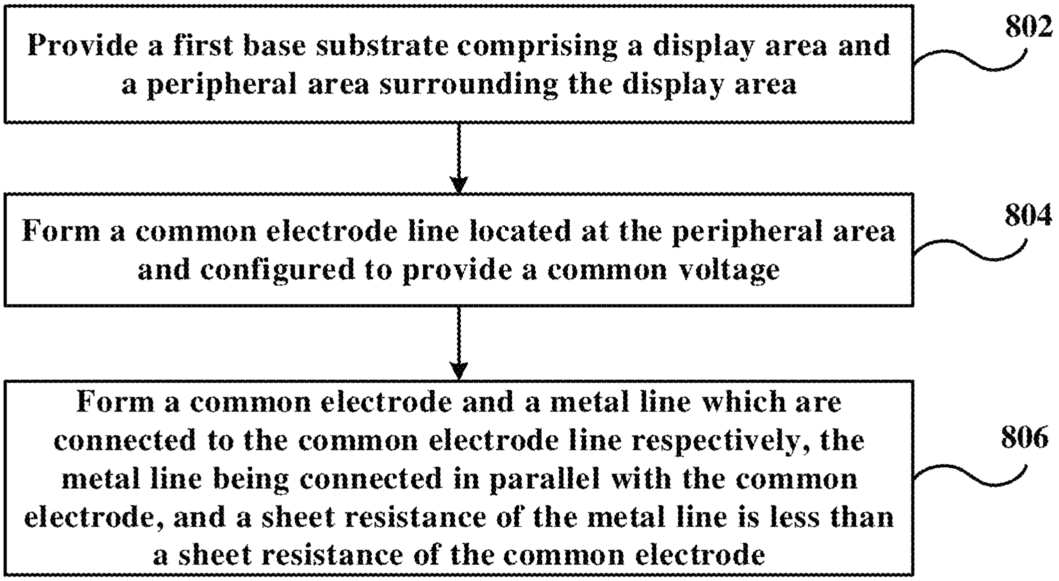
FIG. 8 is a flow chart showing a manufacturing method of a liquid crystal display panel according to some embodiments of the present disclosure.

FIG. 8 is a flow chart showing a manufacturing method of a liquid crystal display panel according to some embodiments of the present disclosure.

As shown in FIG. 8, the manufacturing method of a liquid crystal display panel comprises steps 802 to 806.

At step 802, a first base substrate is provided. The first base substrate comprises a display area and a peripheral area surrounding the display area.

At step 804, a common electrode line located at the peripheral area is formed. The common electrode line is configured to provide a common voltage.

At step 806, a common electrode and a metal line which are connected to the common electrode line are formed. The metal line is at least partially located at the display area, and the metal line is connected in parallel with the common electrode. The sheet resistance of the metal line is less than that of the common electrode.

In a case where the liquid crystal display panel formed in the above embodiments comprises a metal line connected to the common electrode line and connected in parallel with the common electrode, the sheet resistance of the common electrode and the metal line connected in parallel as a whole is less than that of the common electrode, thereby reducing the sheet resistance of the wiring of the common voltage. With this structure, on one hand, it is not easy for the common voltage to deviate from an expected value; on the other hand, even if the common voltage deviates from the expected value, it is also easier for the common voltage to rebound to the expected value. In this way, it is helpful to improve the stability and rebound resilience of the common voltage, thereby alleviating the flicker problem of the liquid crystal display panel to enhance the display effect of the liquid crystal display panel.

Figure 9:
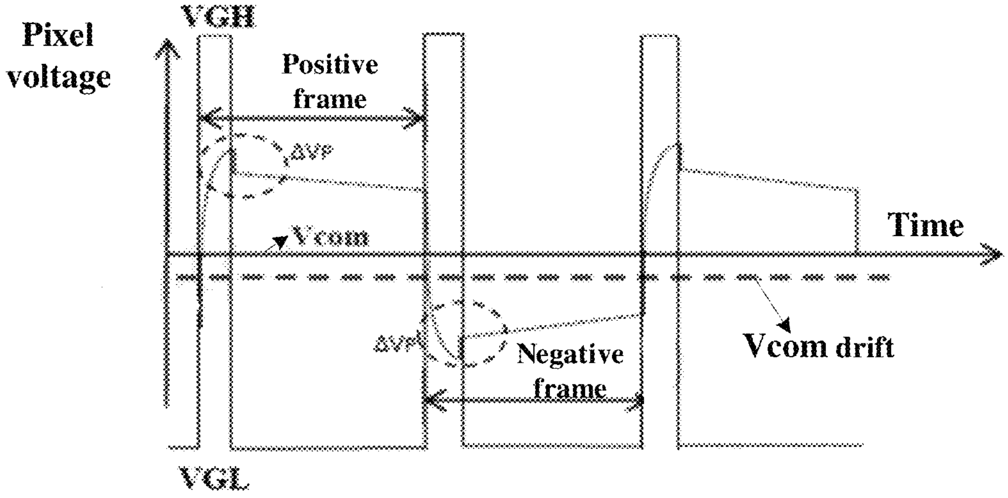
FIG. 9 is a schematic view showing change of a pixel voltage of a liquid crystal display panel.

There are various reasons for flicker. The inventors have noticed that the pixel voltage on the pixel electrode will jump when the sub-pixel is turned on or off and jump voltage (ΔVP) is one of the reasons for flicker. FIG. 9 is a schematic view showing change of a pixel voltage of a liquid crystal display panel. FIG. 9 also shows a drift phenomenon of the common voltage Vcom provided by the common electrode.

When ΔVP decreases, flicker can be alleviated. ΔVP may be calculated according to the following formula:

$$\Delta V_p = \frac{C_{gs}}{C_{gs} + C_{st} + C_{lc}}(V_{GH} - V_{GL})$$

In this formula, $C_{gs}$ is capacitance between a gate and a source/drain of a driving transistor in a sub-pixel, $C_{st}$ is storage capacitance between a common electrode and a pixel electrode, $C_{lc}$ is liquid crystal capacitance, $V_{GH}$ is high voltage of the gate of the driving transistor, and $V_{GL}$ is low voltage of the gate of the driving transistor.

Figure 10A:
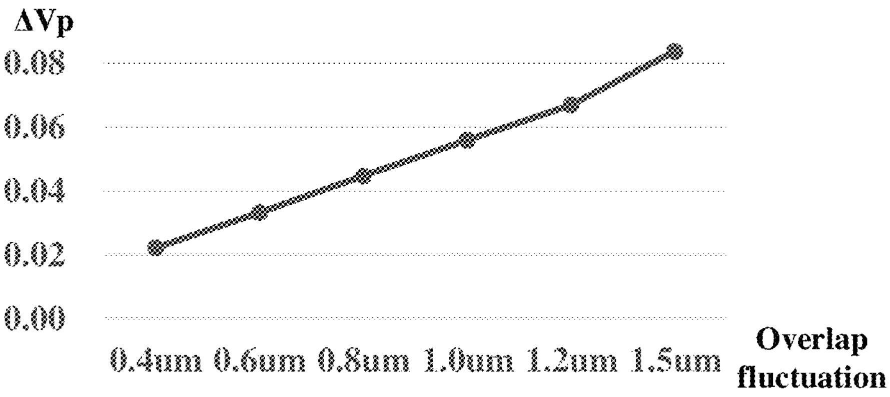
FIGS. 10A to 10C are schematic views showing a relationship between fluctuation of different parameters and a jump voltage.
Figure 10B:
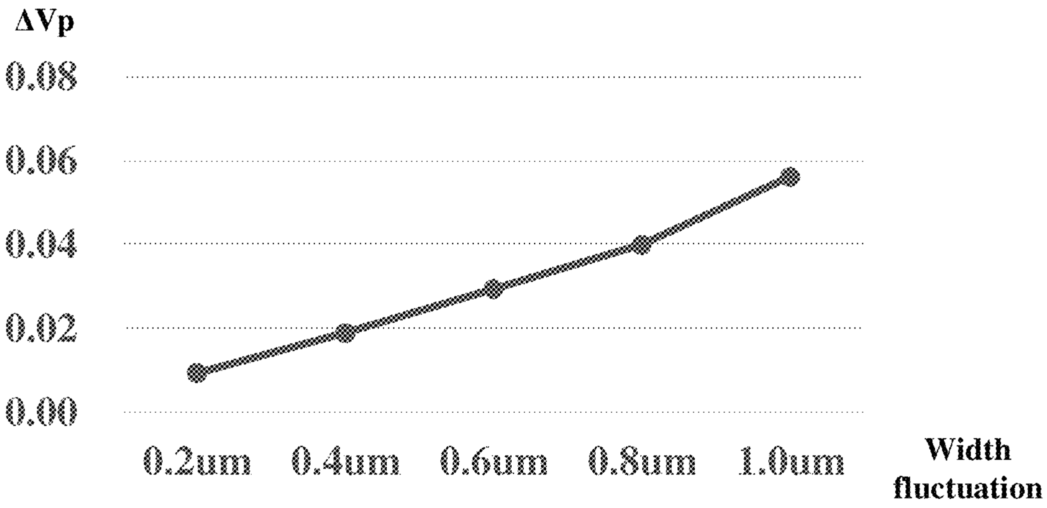
Figure 10C:
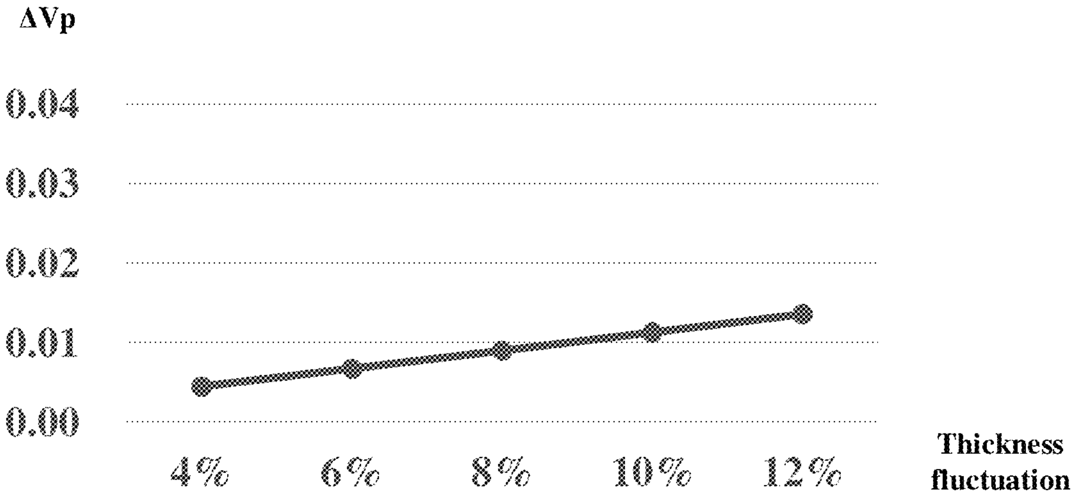

It is found through studies that, $C_{gs}$ and $C_{st}$ are likely to be affected by the manufacturing process. FIGS. 10A to 10C are schematic views showing a relationship between fluctuation of different parameters and a jump voltage.

Firstly, the fluctuation of the size of an overlapping portion between the gate and the source/drain of the driving transistor in the sub-pixel will affect $C_{gs}$.

As shown in table 1 and FIG. 10A, the smaller the fluctuation of the size of the overlapping portion is, the smaller ΔVP will be.

TABLE 1

| | Overlap fluctuation | | | | | |
|---|---|---|---|---|---|---|
| | 0.4 um | 0.6 um | 0.8 um | 1.0 um | 1.2 um | 1.5 um |
| $\Delta V_P$ | 0.0221 | 0.0331 | 0.0446 | 0.0558 | 0.0669 | 0.0873 |

Secondly, the fluctuation of the width of the pixel electrode will affect $C_{st}$. As shown in Table 2 and FIG. 10B, the smaller the fluctuation of the width of the pixel electrode is, the smaller ΔVP will be.

TABLE 2

| | Fluctuation of the width of the pixel electrode | | | | |
|---|---|---|---|---|---|
| | 0.2 um | 0.4 um | 0.6 um | 0.8 um | 1.0 um |
| $\Delta V_P$ | 0.0092 | 0.0188 | 0.0293 | 0.0399 | 0.0562 |

Thirdly, the fluctuation of the thickness of the insulating layer (referring to the first insulating layer PV1 in FIGS. 6A and 6B) between the common electrode and the pixel electrode will affect $C_{st}$. As shown in Table 3 and FIG. 10C, the smaller the thickness fluctuation of the first insulating layer is, the smaller ΔVP will be.

TABLE 3

| | Fluctuation of the thickness of the insulating layer | | | | |
|---|---|---|---|---|---|
| | 4% | 6% | 8% | 10% | 12% |
| $\Delta V_P$ | 0.0045 | 0.0067 | 0.0090 | 0.0113 | 0.0136 |

Based on the above analysis conclusion, the present disclosure provides the technical solutions of alleviating the flicker problem of the liquid crystal display panel according to further embodiments.

Figure 11:
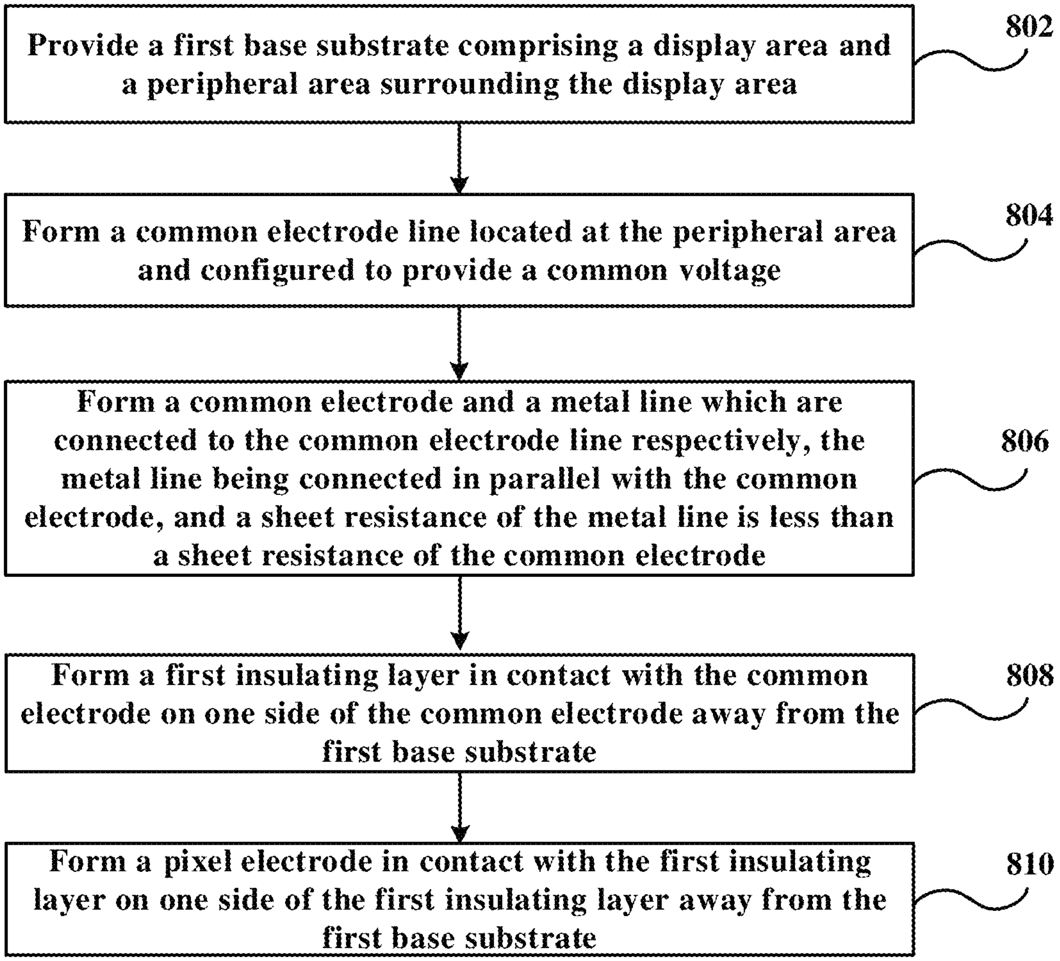
FIG. 11 is a flow chart showing a manufacturing method of a liquid crystal display panel according to other embodiments of the present disclosure.

FIG. 11 is a flow chart showing a manufacturing method of a liquid crystal display panel according to other embodiments of the present disclosure.

Compared with FIG. 8, the manufacturing method shown in FIG. 11 further comprises steps 808 to 810.

At step 808, a first insulating layer in contact with the common electrode is formed on one side of the common electrode away from the first base substrate. The pressure applied during the process of forming the first insulating layer is greater than or equal to 1.2 torr and less than 1.5 torr. For example, the pressure applied during the process of forming the first insulating layer is 1.3 torr, 1.4 torr, etc.

In some embodiments, the first insulating layer is formed by using a chemical vapor deposition (CVD) process. For example, $SiH_4$, $NH_3$, $H_2$, $O_2$ and other gas(es) are used to form the first insulating layer through chemical reaction at a certain temperature and within the above pressure range.

At step 810, a pixel electrode in contact with the first insulating layer is formed on one side of the first insulating layer away from the first base substrate.

In the above embodiments, the pressure applied during the process of forming the first insulating layer is greater than or equal to 1.2 torr and less than 1.5 torr. In this way, the precision of the thickness of the formed first insulating layer is higher, and the thickness fluctuation of the first insulating layer is smaller, which is helpful to reduce ΔVP.

In some embodiments, the manufacturing method of a liquid crystal display panel further comprises forming a pixel electrode. The viscosity of the material of the pixel electrode is greater than 3 mPa·s and less than or equal to 5 mPa·s. For example, the viscosity of the material of the pixel electrode is 3.5 mPa·s, 3.8 mPa·s, 4 mPa·s, 4.5 mPa·s, etc. In this way, the precision of the width of the formed pixel electrode is higher, and the fluctuation of the width of the pixel electrode is smaller, which is helpful to reduce ΔVP.

In some embodiments, the viscosity of the material of the pixel electrode is greater than 3 mPa·s and less than or equal to 4 mPa·s. In this way, the precision of the width of the formed pixel electrode is higher, and the fluctuation of the width of the pixel electrode is smaller, which is helpful to further reduce ΔVP.

In some embodiments, the width of the pixel electrode is greater than or equal to 2.5 microns.

To further reduce ΔVP, in some embodiments, the pixel electrode may be formed by the following method.

First, a pixel electrode material layer is formed. For example, the pixel electrode material layer is an ITO layer.

Then, the pixel electrode material layer is etched by using an etching solution to form the pixel electrode. Here, the service life of the etching solution is greater than 0 and less than or equal to 5000 mins. For example, the service life of the etching solution is 3000 mins, 4500 mins, etc.

In a case where the viscosity of the material of the pixel electrode is greater than 3 mPa·s and less than or equal to 5 mPa·s, and the service life of the etching solution is greater than 0 and less than or equal to 5000 mins, the fluctuation of the width of the pixel electrode is further smaller, which is helpful to further reduce ΔVP.

In some embodiments, the viscosity of the material of the pixel electrode is greater than 3 mPa·s and less than or equal to 5 mPa·s, the service life of the etching solution is greater than 0 and less than or equal to 5000 mins, and the duration of the etching is greater than or equal to 160 seconds and less than or equal to 180 seconds. For example, the duration of the etching is 170 seconds, 175 seconds, etc. In this way, the fluctuation of the width of the pixel electrode is smaller, which is helpful to further reduce ΔVP.

In some embodiments, the viscosity of the material of the pixel electrode is greater than 3 mPa·s and less than or equal to 5 mPa·s, the service life of the etching solution is greater than 0 and less than or equal to 5000 mins, the duration of the etching is greater than or equal to 160 seconds and less than or equal to 180 seconds, and the width of the formed pixel electrode is greater than or equal to 2.5 microns. In this way, the fluctuation of the width of the pixel electrode is smaller, which is helpful to further reduce ΔVP.

In some embodiments, the manufacturing method of a liquid crystal display panel further comprises forming a pixel driving circuit comprising a driving transistor. For example, the drain of the driving transistor is connected to the pixel electrode, and the source of the driving transistor is connected to the common electrode.

To further reduce ΔVP, in some embodiments, the driving transistor may be formed by the following method.

First, a gate of the driving transistor is formed.

Then, an electrode material layer is s formed. In some embodiments, before forming the electrode material layer, a gate insulating layer (for example, referring to the fourth insulating layer GI shown in FIG. 6A) is formed on one side of the gate, and an active layer is formed on one side of the gate insulating layer away from the gate.

Then, a mask plate is aligned with each alignment mark of the mask plate.

For example, the mask plate comprises 6 slots in total, and each slot has 6 alignment marks (also referred to as an alignment point). The mask plate is aligned by using all the alignment marks (36 in total).

Next, after the alignment, the electrode material layer is patterned by using the mask plate to form a source and a drain of the driving transistor.

In this way, it is helpful to reduce the fluctuation of the size of an overlapping area between the gate and the source/drain of the driving transistor, thereby further reducing ΔVP.

In some embodiments, the fluctuation of the thickness of the first insulating layer PVX1 is less than or equal to 10%, the fluctuation of the size of an overlapping portion between the gate and the source/drain of the driving transistor is less than or equal to 1 micron, and the fluctuation of the width of the pixel electrode is less than or equal to 0.6 micron.

The present disclosure also provides a manufacturing method of a display substrate.

In some embodiments, the manufacturing method of a display substrate comprises steps 802 to 806 shown in FIG. 8. In this case, the display substrate is an array substrate or a color film substrate.

In other embodiments, the manufacturing method of a display substrate comprises steps 802 to 810 shown in FIG. 11. In this case, the display substrate is an array substrate.

For the specific implementation of steps 802 to 810, reference may be made to the above description, which will not be described in detail here.

The embodiments of the disclosure also provide another liquid crystal display panel.

Referring to FIGS. 2A and 2B, the liquid crystal display panel comprises a first base substrate 11, a common electrode line 12 and a common electrode 13. In addition, the liquid crystal display panel also satisfies at least one of a first condition, a second condition or a third condition described hereinafter.

The first base substrate 11 comprises a display area 111 and a peripheral area 112 surrounding the display area 111. The common electrode line 12 is located at the peripheral area 112 and configured to provide a common voltage to the common electrode 13. The common electrode 13 is connected to the common electrode line 12.

The first condition comprises: the liquid crystal display panel comprises a metal line 14 (see FIG. 2B) connected to the common electrode line 12 and connected in parallel with the common electrode 13, and the sheet resistance of the metal line 14 is less than that of the common electrode 13. In this way, the sheet resistance of the wiring of the common voltage is reduced, which is helpful to improve the stability and rebound resilience of the common voltage, thereby alleviating the flicker problem of the liquid crystal display panel.

The second condition comprises: the elastic constant of the liquid crystal in the liquid crystal display panel at 50° C. is greater than or equal to 13.5. In some embodiments, the second condition further comprises: the elastic constant of the liquid crystal in the liquid crystal display panel at 25° C. is greater than or equal to 17. In this way, the rigidity of liquid crystal is increased, and the fluctuation of the transmittance caused by liquid crystal molecular vibration is reduced when switching between positive and negative frames, thereby further alleviating the flicker problem of the liquid crystal display panel.

The third condition comprises: the viscosity of the material of the pixel electrode in the liquid crystal display panel is greater than 3 mPa·s and less than or equal to 5 mPa·s. In this way, the precision of the width of the pixel electrode during the forming process is higher, and the fluctuation of the width of the pixel electrode is smaller, which is helpful to reduce ΔVP, thereby alleviating the flicker problem of the liquid crystal display panel.

In the above embodiments, the liquid crystal display panel satisfies at least one of the first condition, the second condition or the third condition. In this way, it is helpful to alleviate the flicker problem of the liquid crystal display panel to enhance the display effect of the liquid crystal display panel.

In some embodiments, the liquid crystal display panel satisfies a plurality of conditions (for example, two or three conditions) of the first condition, the second condition and the third condition. In this way, it is helpful to alleviate the flicker problem of the liquid crystal display panel to further enhance the display effect of the liquid crystal display panel.

The technical effects of some embodiments of the present disclosure will be described below in conjunction with some test data.

Figure 12:
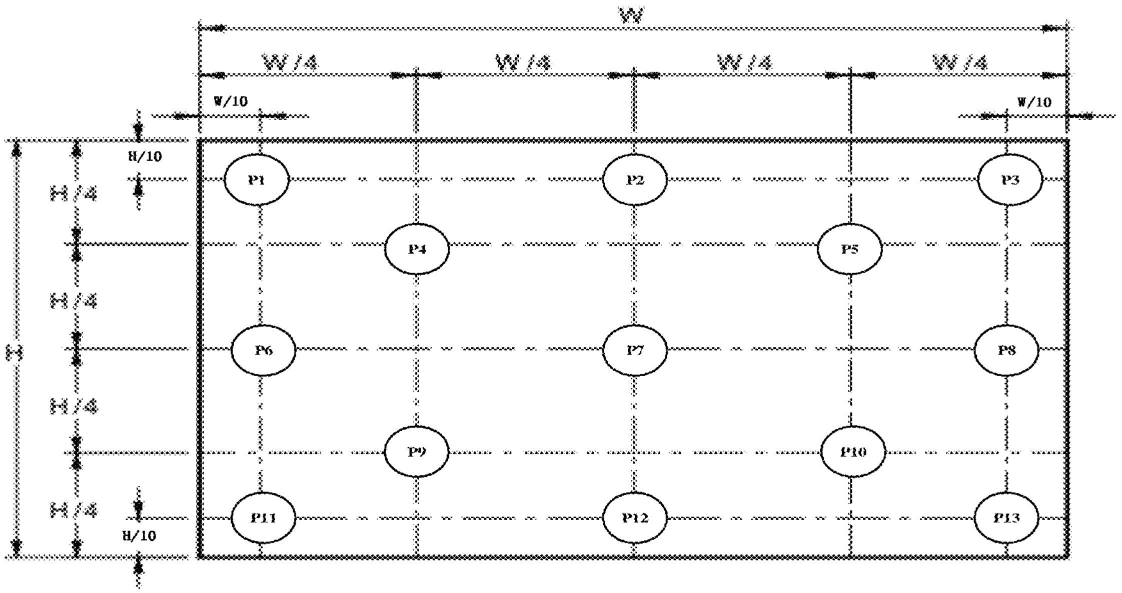
FIG. 12 is a schematic view showing test points according to some embodiments of the present disclosure.

FIG. 12 is a schematic view showing test points according to some embodiments of the present disclosure. In FIG. 12, W is the width of the display area of the liquid crystal display panel, and H is the height of the display area of the liquid crystal display panel.

The first process condition is: the thickness of the first insulating layer PVX1 is 1500 angstroms, the fluctuation of the thickness is ±12%, the fluctuation of the size of an overlapping portion between the gate and the source/drain of the driving transistor is ±1.5 microns, and the fluctuation of the width of the pixel electrode is ±1 micron.

The second process condition is: the thickness of the first insulating layer PVX1 is 1500 angstroms, the fluctuation of the thickness of the first insulating layer PVX1 is ±10%, the fluctuation of the size of an overlapping portion between the gate and the source/drain of the driving transistor is ±1 micron, and the fluctuation of the width of the pixel electrode is ±0.6 micron.

Under the first process condition, the flicker of the test points P1 to P13 in FIG. 12 is tested. Tables 4 and 5 are the test data under the first process condition. Table 4 shows the flicker of each test point at different fixed refresh rates. Table 5 shows the flicker of each test point at dynamic refresh rates.

TABLE 4

| | Refresh rate (Hz) | | | | | | | | | | |
|---|---|---|---|---|---|---|---|---|---|---|---|
| Items | Minimum | 23.976 | 24 | 25 | 29.97 | 30 | 47.952 | 48 | 50 | 59.94 | 60 |
| P1 | −64.05 | −63.65 | −63.66 | −64.59 | −66.46 | −66.60 | −75.98 | −76.42 | −78.06 | −80.97 | −80.71 |
| P2 | −66.26 | −65.45 | −64.59 | −65.12 | −69.00 | −69.60 | −77.00 | −76.59 | −77.86 | −81.98 | −79.53 |
| P3 | −65.44 | −65.31 | −64.14 | −65.44 | −68.17 | −68.79 | −76.41 | −76.42 | −77.07 | −80.54 | −80.44 |
| P4 | −65.73 | −65.68 | −65.66 | −65.76 | −68.49 | −68.64 | −76.41 | −76.27 | −77.21 | −80.57 | −80.22 |
| P5 | −66.82 | −66.71 | −66.46 | −66.71 | −69.26 | −69.60 | −75.95 | −76.06 | −78.08 | −80.02 | −80.23 |
| P6 | −62.34 | −62.51 | −62.23 | −62.45 | −64.65 | −66.25 | −75.33 | −76.14 | −77.72 | −80.43 | −81.43 |
| P7 | −66.38 | −66.23 | −65.85 | −65.94 | −68.92 | −69.22 | −76.80 | −77.12 | −78.34 | −80.98 | −81.03 |
| P8 | −65.70 | −64.78 | −65.03 | −65.34 | −67.70 | −68.81 | −75.17 | −75.76 | −76.37 | −78.71 | −79.81 |
| P9 | −65.30 | −65.49 | −65.18 | −65.39 | −68.24 | −68.35 | −76.51 | −76.81 | −78.65 | −81.56 | −81.21 |
| P10 | −66.07 | −66.60 | −66.39 | −66.47 | −69.29 | −69.40 | −77.10 | −76.79 | −78.49 | −80.93 | −81.60 |
| P11 | −61.95 | −63.92 | −62.92 | −64.21 | −67.66 | −67.57 | −76.38 | −76.30 | −78.00 | −80.85 | −80.24 |
| P12 | −62.90 | −64.13 | −64.04 | −64.00 | −67.61 | −67.69 | −76.13 | −76.33 | −78.15 | −81.21 | −80.20 |
| P13 | −63.17 | −64.74 | −64.21 | −63.94 | −66.65 | −67.12 | −75.04 | −75.69 | −75.96 | −79.18 | −78.91 |
| Expected | | | | | | <−60 dB | | | | | |

TABLE 5

| | Refresh rate (Hz) | | | |
|---|---|---|---|---|
| Items | Random | Sine wave | Square wave | Zigzag wave |
| P1 | −63.99 | −78.35 | −63.85 | −79.17 |
| P2 | −68.12 | −78.17 | −64.32 | −79.14 |
| P3 | −65.43 | −79.31 | −61.75 | −81.74 |
| P4 | −65.54 | −77.08 | −61.12 | −81.79 |
| P5 | −61.54 | −78.74 | −62.94 | −80.79 |
| P6 | −65.12 | −77.78 | −58.28 | −79.26 |
| P7 | −66.31 | −76.47 | −58.65 | −81.81 |
| P8 | −66.97 | −77.73 | −60.27 | −80.77 |
| P9 | −64.47 | −79.86 | −64.93 | −80.45 |
| P10 | −65.99 | −79.60 | −64.51 | −80.78 |
| P11 | −63.84 | −77.69 | −59.86 | −80.74 |
| P12 | −63.48 | −78.02 | −63.55 | −80.50 |
| P13 | −67.36 | −77.94 | −63.54 | −81.80 |
| Expected | | | <−60 dB | |

As can be known from Table 4 and Table 5, under the first process condition, the flicker of each test point can meet an expected value, that is, less than-60 dB in a case where the refresh rate is a fixed refresh rate. However, in a case where the refresh rate changes according to a square wave, the flicker of the test points P6, P7 and P10 cannot meet an expected value.

Under the second process condition, the flicker of the test points P1 to P13 in FIG. 12 is tested. Tables 6 and 7 are the test data under the second process condition. Table 6 shows the flicker of each test point at different fixed refresh rates. Table 7 shows the flicker of each test point at dynamic refresh rates.

TABLE 6

| | Refresh rate (Hz) | | | | | | | | | | |
|---|---|---|---|---|---|---|---|---|---|---|---|
| Items | Minimum | 23.976 | 24 | 25 | 29.97 | 30 | 47.952 | 48 | 50 | 59.94 | 60 |
| P1 | −73.08 | −70.84 | −70.94 | −68.67 | −72.55 | −73.01 | −77.71 | −76.48 | −78.36 | −80.74 | −80.96 |
| P2 | −69.15 | −70.22 | −69.78 | −69.67 | −71.89 | −72.01 | −77.60 | −77.34 | −78.59 | −81.90 | −81.17 |
| P3 | −66.86 | −68.80 | −69.92 | −69.04 | −72.07 | −71.60 | −75.70 | −76.47 | −78.24 | −80.21 | −80.28 |
| P4 | −70.93 | −72.91 | −73.92 | −73.91 | −73.50 | −73.93 | −77.17 | −76.86 | −77.51 | −80.33 | −80.84 |
| P5 | −68.73 | −70.70 | −71.22 | −71.00 | −72.64 | −72.79 | −77.24 | −76.50 | −78.26 | −80.80 | −80.80 |
| P6 | −72.53 | −72.45 | −72.15 | −71.79 | −72.64 | −73.08 | −77.55 | −76.82 | −78.14 | −80.69 | −80.94 |
| P7 | −67.93 | −70.08 | −70.82 | −71.03 | −72.16 | −72.46 | −76.83 | −76.52 | −77.94 | −80.06 | −82.10 |
| P8 | −66.66 | −67.99 | −69.06 | −69.10 | −70.82 | −70.95 | −75.86 | −76.48 | −77.21 | −80.93 | −81.36 |
| P9 | −69.36 | −72.16 | −70.69 | −71.87 | −72.46 | −72.54 | −76.16 | −76.13 | −77.16 | −80.82 | −80.88 |
| P10 | −67.43 | −69.13 | −68.92 | −69.41 | −71.33 | −71.46 | −76.47 | −76.20 | −77.91 | −80.85 | −80.31 |
| P11 | −69.17 | −70.38 | −69.68 | −70.48 | −71.69 | −72.02 | −75.96 | −75.75 | −76.92 | −79.77 | −80.22 |
| P12 | −65.23 | −66.31 | −66.05 | −66.58 | −69.18 | −70.09 | −76.17 | −76.06 | −77.29 | −80.29 | −80.54 |
| P13 | −65.70 | −67.34 | −67.12 | −67.44 | −69.07 | −70.04 | −72.60 | −72.93 | −75.55 | −78.70 | −78.98 |
| Expected | <−60 dB | | | | | | | | | | |

TABLE 7

| | Refresh rate (Hz) | | | |
|---|---|---|---|---|
| Items | Random | Sine wave | Square wave | Zigzag wave |
| P1 | −68.79 | −78.35 | −62.06 | −81.20 |
| P2 | −68.46 | −78.96 | −62.37 | −80.75 |
| P3 | −65.88 | −79.53 | −69.72 | −80.44 |
| P4 | −69.00 | −79.90 | −67.32 | −80.13 |
| P5 | −68.61 | −79.65 | −66.45 | −81.48 |
| P6 | −68.65 | −80.71 | −61.77 | −81.12 |
| P7 | −69.71 | −79.29 | −66.36 | −81.53 |
| P8 | −69.54 | −79.45 | −62.11 | −80.59 |
| P9 | −64.86 | −79.02 | −67.57 | −80.42 |
| P10 | −68.27 | −79.23 | −64.90 | −80.99 |
| P11 | −66.24 | −79.25 | −67.34 | −81.98 |
| P12 | −66.26 | −78.61 | −66.30 | −79.78 |
| P13 | −65.32 | −78.52 | −63.81 | −81.04 |
| Expected | <−60 dB | | | |

As can be known from Table 6 and Table 7, under the second process condition, in a case where the refresh rate is a fixed refresh rate or a dynamic refresh rate, the flicker of each of the test points P1 to P13 can meet an expected value.

It should be understood that, the second process condition can be realized by the method introduced above in the present disclosure.

The third process condition is: the elastic constant of the liquid crystal in the liquid crystal display panel is 13.8 at 25° C. and the elastic constant of the liquid crystal in the liquid crystal display panel is 10.6 at 50° C.

The fourth process condition is: the elastic constant of liquid crystal in the liquid crystal display panel is 17 at 25° C. and the elastic constant of the liquid crystal in the liquid crystal display panel is 13.5 at 50° C.

Under the second process condition and the third process condition, the flicker of the test points P1 to P13 in FIG. 12 is tested at a normal temperature (25° C.) and a high temperature (50° C.) respectively. Table 8 shows the test data at 25° C. under the second process condition and the third process condition. Table 9 shows the test data at 50° C. under the second process condition and the third process condition. In Tables 8 and 9, M1, M2 and M3 represent different test samples (i.e., different liquid crystal display panels).

TABLE 8

| | Refresh rate 60 Hz | | | Refresh rate 40 Hz | | | Refresh rate 30 Hz | | | Refresh rate 20 Hz | | |
|---|---|---|---|---|---|---|---|---|---|---|---|---|
| Items | M1 25□ | M2 25□ | M3 25□ | M1 25□ | M2 25□ | M3 25□ | M1 25□ | M2 25□ | M3 25□ | M1 25□ | M2 25□ | M3 25□ |
| P1 | −76.5 | −76.36 | −74.62 | −69.79 | −65.75 | −69.93 | −67.28 | −66.44 | −68.13 | −66.94 | −64.04 | −65.01 |
| P2 | −75.99 | −73.05 | −76.53 | −69.03 | −68.04 | −70.8 | −69.2 | −66.48 | −69.08 | −66.33 | −63.47 | −66.37 |
| P3 | −74.34 | −76.23 | −75.2 | −68.6 | −67.64 | −70.07 | −66.05 | −66.58 | −67.92 | −64.26 | −66.32 | −64.12 |
| P4 | −78.58 | −76.8 | −75.13 | −69.4 | −69.12 | −69.06 | −67.43 | −66.48 | −69.02 | −66.24 | −62.33 | −69.1 |
| P5 | −77.16 | −78.98 | −75.96 | −70.32 | −69.09 | −69.74 | −66.63 | −67.72 | −68.67 | −65.05 | −63.79 | −66.25 |
| P6 | −79.13 | −76.93 | −72.99 | −69.46 | −68.12 | −66.61 | −67.27 | −65.52 | −70.97 | −67.04 | −64.17 | −69.11 |
| P7 | −77.82 | −77.09 | −73.97 | −68.56 | −68.62 | −69.47 | −65.95 | −67.53 | −68.68 | −63.75 | −65.7 | −67.86 |
| P8 | −75.28 | −75.95 | −72.94 | −69.19 | −69.43 | −69.58 | −68.41 | −69.84 | −69.79 | −62.51 | −66.78 | −66.34 |
| P9 | −75.92 | −77.65 | −75.67 | −70.3 | −69.01 | −67.9 | −66.45 | −68.64 | −72.2 | −64.25 | −67.27 | −69.26 |
| P10 | −75.66 | −75.37 | −74.9 | −70.16 | −68.4 | −69.17 | −67.89 | −68.17 | −69.74 | −66.68 | −70.09 | −71.65 |
| P11 | −74.72 | −75.71 | −74.76 | −68.05 | −68.93 | −65.67 | −68.87 | −67.76 | −70.61 | −68.95 | −66.75 | −71.55 |
| P12 | −78.92 | −77.25 | −76.72 | −68.94 | −68.54 | −70.56 | −67.65 | −67.49 | −70.95 | −65.19 | −68.71 | −67.77 |
| P13 | −76.56 | −75.9 | −77.08 | −68.39 | −69.16 | −69.83 | −68.23 | −69.02 | −69.28 | −64.42 | −66.85 | −66.89 |
| Maximum | −74.34 | −73.05 | −72.94 | −68.05 | −65.75 | −65.67 | −65.95 | −65.52 | −67.92 | −62.51 | −62.33 | −64.12 |
| Average | −76.66 | −76.41 | −75.11 | −69.25 | −68.45 | −69.11 | −67.49 | −67.51 | −69.62 | −65.51 | −65.87 | −67.79 |
| Expected | <−60 dB | | | | | | | | | | | |

TABLE 9

| Items | Refresh rate 60 Hz | | | Refresh rate 40 Hz | | | Refresh rate 30 Hz | | | Refresh rate 20 Hz | | |
|---|---|---|---|---|---|---|---|---|---|---|---|---|
| | M1 50□ | M2 50□ | M3 50□ | M1 50□ | M2 50□ | M3 50□ | M1 50□ | M2 50□ | M3 50□ | M1 50□ | M2 50□ | M3 50□ |
| P1 | −71.59 | −68.44 | −68.69 | −63.77 | −69.51 | −61.33 | −59.6 | −63.29 | −57.16 | −56.38 | −60.18 | −53.42 |
| P2 | −68.71 | −68.71 | −68.79 | −63.49 | −60.11 | −65.94 | −59.11 | −54.95 | −60.87 | −56.06 | −51.93 | −57.05 |
| P3 | −71.92 | −68.62 | −70.93 | −67.45 | −63.68 | −65.88 | −63.42 | −59.18 | −61.65 | −58.53 | −57.05 | −58.3 |
| P4 | −69.01 | −72.56 | −69.04 | −63.42 | −61.99 | −63.03 | −59.44 | −57.93 | −59.12 | −56.22 | −55.09 | −56.09 |
| P5 | −70.68 | −74.97 | −70.93 | −65.26 | −68.61 | −63.17 | −61.87 | −58.65 | −58.83 | −58.92 | −56 | −56.41 |
| P6 | −69.06 | −75.07 | −69.91 | −65.3 | −63.32 | −61.79 | −61.69 | −67.64 | −58.28 | −59.21 | −62.97 | −55.51 |
| P7 | −73.7 | −70.94 | −70.59 | −63.85 | −63.3 | −64.16 | −60.78 | −56.43 | −60.15 | −58.86 | −54.29 | −58.25 |
| P8 | −76.15 | −71.58 | −71.18 | −69 | −62.57 | −66.23 | −66.26 | −60.25 | −63.13 | −60.94 | −58.12 | −60.63 |
| P9 | −75.38 | −73.11 | −67.93 | −62.69 | −70.11 | −63.26 | −60.1 | −60.24 | −59.99 | −58.88 | −58.07 | −57.57 |
| P10 | −73.22 | −67.48 | −75.18 | −62.33 | −70.06 | −62.07 | −60.22 | −59.44 | −58.79 | −58.49 | −57.62 | −57.15 |
| P11 | −69.44 | −68.88 | −66.96 | −60.4 | −71.08 | −61.44 | −57.21 | −60.81 | −57.36 | −56.59 | −60.14 | −56.08 |
| P12 | −66.65 | −74.01 | −66.59 | −60.42 | −71.98 | −60.99 | −57.86 | −55.8 | −57.84 | −56.15 | −54.35 | −55.78 |
| P13 | −68.17 | −69.57 | −71.58 | −63.42 | −63.25 | −64.39 | −61.32 | −60.1 | −62.14 | −59.24 | −59.58 | −61.41 |
| Maximum | −66.65 | −67.48 | −66.59 | −60.4 | −60.11 | −60.99 | −57.21 | −54.95 | −57.16 | −56.06 | −51.93 | −53.42 |
| Average | −71.05 | −71.07 | −69.87 | −63.91 | −66.12 | −63.36 | −60.68 | −59.59 | −59.64 | −58.04 | −57.34 | −57.2 |
| Expected | | | | | | | <−55 dB | | | | | |

As can be seen from Table 8 and Table 9, at 25° C., in a case where the refresh rate is each of 20 Hz, 30 Hz, 40 Hz and 60 Hz, the flicker of each test point of each of the test samples M1, M2 and M3 meets an expected value, that is, less than −60 dB.

At 50° C., in a case where the refresh rate is each of 40 Hz and 60 Hz, the flicker of each test point of each of the test samples M1, M2 and M3 meets an expected value, that is, less than −55 dB. In a case where the refresh rate is 30 Hz, the flicker of the test point P2 of the test sample M2 and maximum value of the flicker of the test sample M2 cannot meet an expected value. In a case where the refresh rate is 20 Hz, the flicker of the test points P2, P7 and P12 of the test sample M2 and the maximum value of the flicker of the test sample M2 cannot meet an expected value, and the flicker of the test point P1 of the test sample M3 and the maximum value of the flicker of the test sample M3 cannot meet an expected value.

Under the second process condition and the fourth process condition, the flicker of the test points P1 to P13 in FIG. 12 is tested at 25° C. and 50° C. respectively. Table 10 shows the test data at 25° C. under the second process condition and the fourth process condition. Table 11 shows the test data at 50° C. under the second process condition and the fourth process condition. Similarly, in Table 10 and Table 11, M1, M2 and M3 represent different test samples.

TABLE 10

| Items | Refresh rate 60 Hz | | | Refresh rate 40 Hz | | | Refresh rate 30 Hz | | | Refresh rate 20 Hz | | |
|---|---|---|---|---|---|---|---|---|---|---|---|---|
| | M1 25□ | M2 25□ | M3 25□ | M1 25□ | M2 25□ | M3 25□ | M1 25□ | M2 25□ | M3 25□ | M1 25□ | M2 25□ | M3 25□ |
| P1 | −78 | −74.65 | −75.89 | −67.91 | −73.96 | −69.21 | −69.58 | −65.38 | −64.24 | −65.9 | −65.46 | −63.44 |
| P2 | −76.71 | −74.44 | −78.65 | −74.64 | −73.98 | −68.43 | −74.59 | −69 | −64.1 | −65.2 | −70.53 | −68.31 |
| P3 | −76.33 | −76.63 | −76.51 | −77.88 | −74.1 | −75.12 | −71.75 | −69.65 | −66.52 | −66.51 | −73.1 | −71.56 |
| P4 | −77.59 | −79.07 | −80.76 | −68.42 | −68.8 | −68.52 | −69.1 | −67.69 | −62.98 | −65.73 | −65.81 | −63.97 |
| P5 | −74.04 | −77.08 | −75.72 | −72.16 | −73.81 | −68.13 | −71.55 | −67.19 | −63.07 | −65.74 | −67.31 | −66.37 |
| P6 | −74.2 | −77.71 | −74.77 | −67.01 | −68.55 | −64.49 | −69.72 | −64.04 | −63.75 | −65.8 | −63.5 | −62.25 |
| P7 | −77.58 | −76.38 | −76.66 | −68.81 | −69.59 | −68.36 | −67.25 | −68.08 | −66.84 | −64.51 | −65.44 | −62.44 |
| P8 | −77.99 | −76.11 | −77.02 | −74.95 | −71.26 | −70.33 | −71.41 | −70.61 | −69.12 | −72.38 | −65.88 | −67.39 |
| P9 | −78.67 | −71.84 | −79.13 | −68.63 | −69.87 | −66.41 | −68.96 | −67.65 | −65.39 | −66.1 | −64.06 | −62.44 |
| P10 | −75.08 | −77.79 | −77.42 | −68.14 | −71.11 | −67.93 | −66.97 | −69.29 | −65.39 | −65.68 | −68.83 | −64.65 |
| P11 | −76.78 | −76.54 | −74.84 | −68.99 | −66.69 | −66.09 | −67.75 | −64.69 | −64.67 | −69.04 | −64.14 | −61.4 |
| P12 | −75.61 | −75.51 | −77.84 | −73.46 | −67.96 | −68.24 | −71.98 | −67.16 | −68.27 | −76.17 | −64.83 | −63.45 |
| P13 | −77.4 | −76.89 | −80.41 | −74.53 | −69.82 | −70.51 | −75.95 | −71.81 | −72.57 | −77.22 | −68.79 | −69.57 |
| Maximum | −74.04 | −71.84 | −74.77 | −67.01 | −66.69 | −64.49 | −66.97 | −64.04 | −62.98 | −64.51 | −63.5 | −61.4 |
| Average | −76.61 | −76.20 | −77.36 | −71.19 | −70.73 | −68.60 | −70.50 | −67.86 | −65.92 | −68.15 | −66.74 | −65.17 |
| Expected | | | | | | | <−60 dB | | | | | |

TABLE 11

| Items | Refresh rate 60 Hz | | | Refresh rate 40 Hz | | | Refresh rate 30 Hz | | | Refresh rate 20 Hz | | |
|---|---|---|---|---|---|---|---|---|---|---|---|---|
| | M1 50□ | M2 50□ | M3 50□ | M1 50□ | M2 50□ | M3 50□ | M1 50□ | M2 50□ | M3 50□ | M1 50□ | M2 50□ | M3 50□ |
| P1 | −74.41 | −73.15 | −73.05 | −64.25 | −65.23 | −67.21 | −59.66 | −66.04 | −62.62 | −55.89 | −61.49 | −60.6 |
| P2 | −78.08 | −74.72 | −77.37 | −65.34 | −64.82 | −69 | −60.14 | −60.4 | −62.04 | −56.69 | −56.03 | −60.24 |
| P3 | −79.95 | −75.67 | −80.79 | −61.85 | −67.07 | −68.69 | −56.9 | −62.29 | −63.55 | −52.96 | −58.02 | −62.86 |
| P4 | −72.15 | −70.85 | −78.2 | −69.43 | −65.96 | −66.2 | −64.74 | −61.44 | −64.72 | −63.21 | −57.85 | −63.29 |
| P5 | −73.83 | −73.8 | −74.11 | −65.87 | −70.01 | −67.34 | −61.44 | −64.29 | −65.16 | −57.84 | −61.46 | −62.15 |
| P6 | −69.29 | −70.67 | −72.49 | −65.75 | −65.53 | −66.33 | −62.09 | −65.32 | −62.45 | −58.35 | −62.69 | −61.43 |
| P7 | −78.42 | −73.91 | −80.74 | −68.88 | −65.23 | −68.58 | −64.99 | −61.03 | −62.23 | −62.06 | −58.33 | −60.15 |
| P8 | −73.72 | −74.56 | −76.66 | −66.54 | −67.57 | −68.32 | −62.33 | −63.56 | −63.4 | −59.32 | −60.36 | −61.36 |
| P9 | −80.24 | −73.56 | −79.18 | −69.25 | −65.16 | −66.65 | −64.97 | −61.41 | −63.35 | −62.23 | −58.31 | −61.49 |
| P10 | −78.16 | −74.7 | −75.3 | −66.91 | −66.5 | −67.75 | −62.9 | −63 | −65.67 | −59.25 | −61.11 | −62.97 |
| P11 | −80.26 | −70.96 | −71.67 | −64.49 | −66.29 | −62.89 | −61.35 | −62.11 | −59.06 | −57.59 | −60.39 | −57.44 |
| P12 | −78.09 | −72.86 | −76.91 | −65.61 | −65.78 | −64.2 | −61.01 | −60.03 | −60.62 | −58.81 | −56.69 | −58.99 |
| P13 | −76.76 | −71.38 | −75.81 | −67.33 | −65.92 | −63.9 | −62.96 | −61.65 | −60.98 | −59.94 | −60.14 | −58.15 |
| Maximum | −69.29 | −70.67 | −71.67 | −61.85 | −64.82 | −62.89 | −56.9 | −60.03 | −59.06 | −52.96 | −56.03 | −57.44 |
| Average | −76.41 | −73.14 | −76.33 | −66.27 | −66.24 | −66.70 | −61.96 | −62.51 | −62.76 | −58.78 | −59.45 | −60.86 |
| Expected | <−55 dB | | | | | | | | | | | |

As can be seen from Tables 10 and 11, at 25° C., in a case where the refresh rate is each of 20 Hz, 30 Hz, 40 Hz and 60 Hz, the flicker of each test point of each of the test samples M1, M2 and M3 meets an expected value, that is, less than-60 dB.

At 50° C., in a case where the refresh rate is each of 30 Hz, 40 Hz and 60 Hz, the flicker of each test point of each of the test samples M1, M2 and M3 meet an expected value, that is, less than-55 dB. In a case where the refresh rate is 20 Hz, the flicker of the test point P1 of the test sample M1 and the maximum value of the flicker of the test sample M1 cannot meet an expected value. It can be seen that, compared with the third process condition, under the fourth process condition, the flicker of the test sample with the refresh rates of 30 Hz and 20 Hz is alleviated.

Figure 13A:
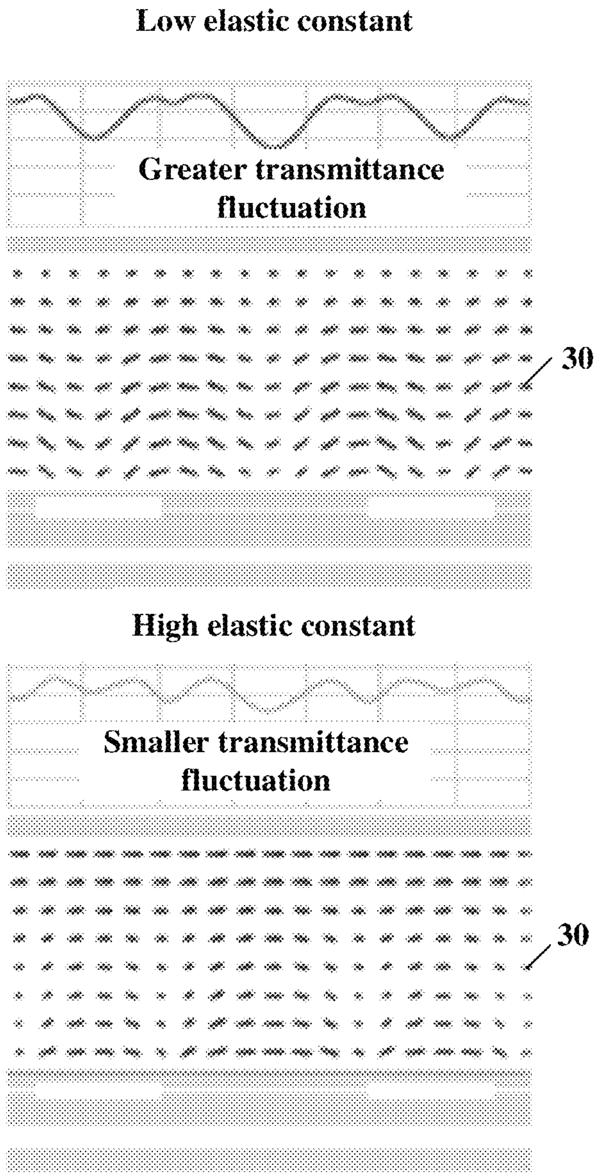
FIGS. 13A and 13B are schematic views showing a relationship between flicker and elastic coefficient.
Figure 13B:
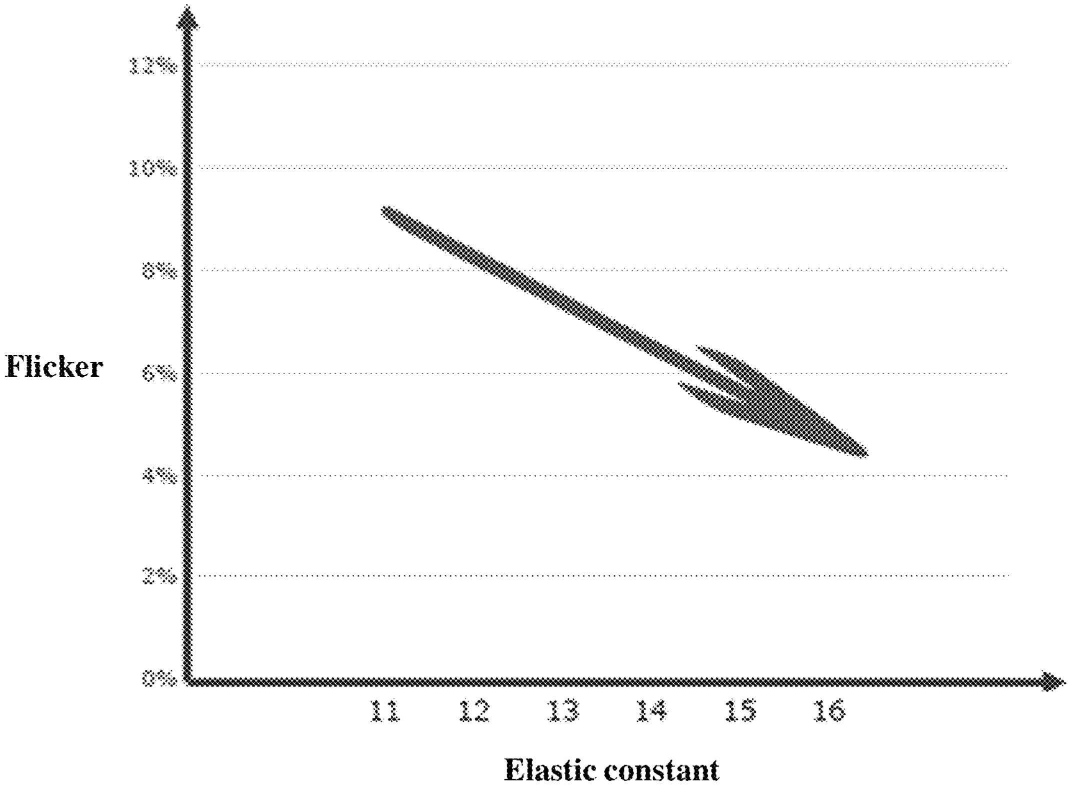

FIGS. 13A and 13B are schematic views showing a relationship between flicker and elastic coefficient. As can be seen from FIG. 13A and FIG. 13B, as the elastic constant increases, the fluctuation of the transmittance becomes smaller and the flicker decreases. When the elastic constant increases, the scattering coefficient of the liquid crystal becomes smaller, the ion concentration in the liquid crystal decreases, and the residual charge within the liquid crystal display panel decreases, thereby stabilizing the voltage of the liquid crystal, reducing the fluctuation of the brightness at a low frequency, and alleviating the flicker problem.

The fifth process condition is: the liquid crystal display panel comprises a metal line connected in parallel with the common electrode.

Under the second process condition, the fourth process condition and the fifth process condition, the flicker of the test points P1 to P13 of each of the test samples M1 to M17 is tested at 50° C. with the refresh rate of 20 Hz.

Figure 14:
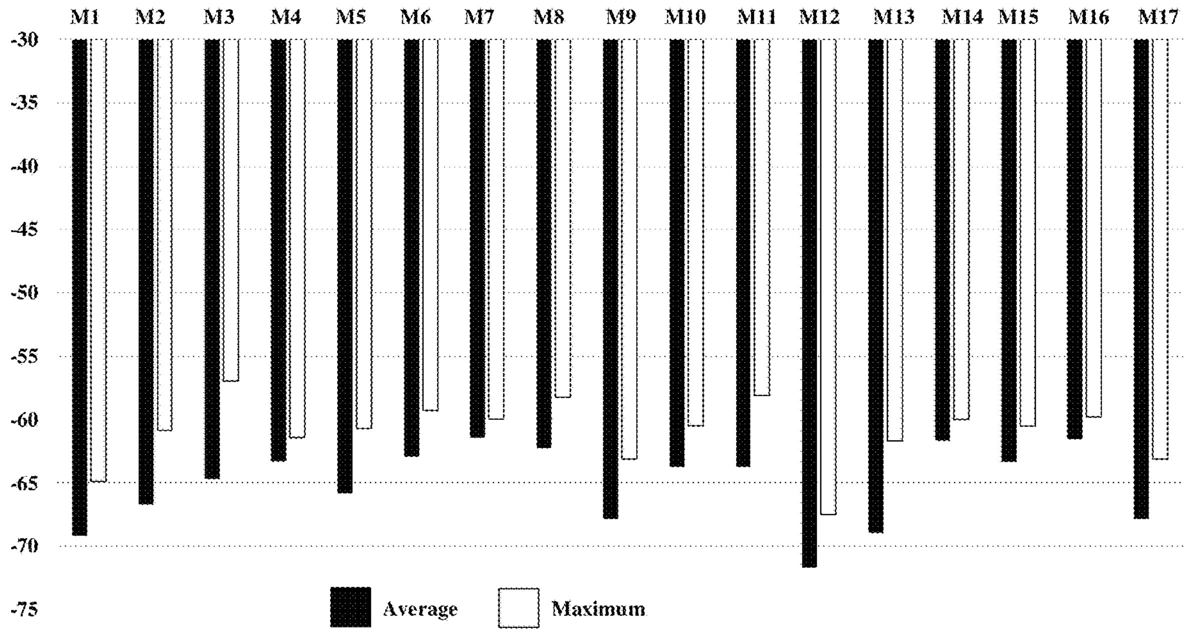
FIG. 14 is a schematic view showing test results under a second process condition, a fourth process condition and a fifth process condition.

FIG. 14 is a schematic view showing test results under a second process condition, a fourth process condition and a fifth process condition.

As shown in FIG. 14, under the second process condition, the fourth process condition and the fifth process condition, the average value and the maximum value of the flicker of each of the test samples M1 to M17 at the refresh rate of 20 Hz all meet an expected value, that is, less than 55 dB. It can be seen that, the flicker problem of the liquid crystal display panel in a high-temperature and low-frequency scenario is effectively improved.

The present disclosure provides a plurality of technical solutions of alleviating the flicker problem when the liquid crystal display panel displays at a low frequency, and it should be understood that, different technical solutions can be combined with each other to obtain a technical solution of more effectively alleviating the flicker problem when the liquid crystal display panel displays at a low frequency.

Figure 15:
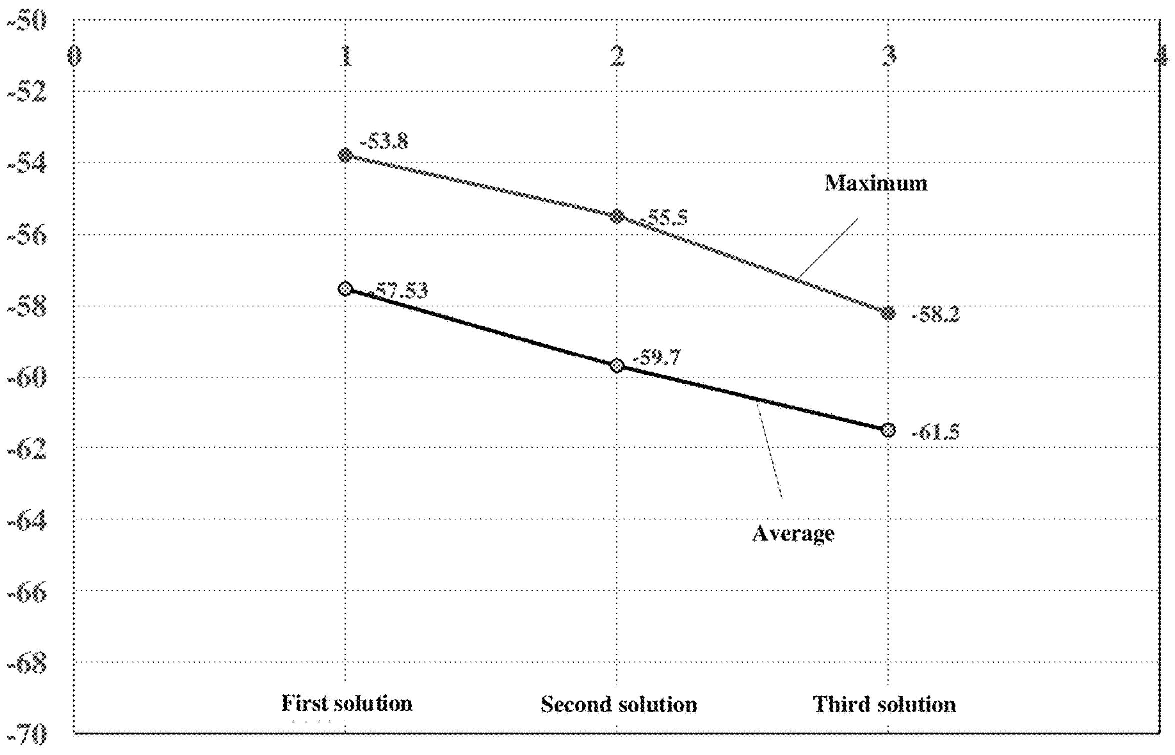
FIG. 15 is a schematic view showing test results under different process conditions.

FIG. 15 is a schematic view showing test results under different process conditions.

In FIG. 15, the first solution satisfies the second process condition, the second solution satisfies the second process condition and the fourth process condition, and the third solution satisfies the second process condition, the fourth process condition and the fifth process condition.

As can be seen from FIG. 15, compared with the first solution, the flicker of the second solution at a high temperature (50° C.) and a low frequency (20 Hz) is reduced by about 2.0 dB; compared with the first solution, the flicker of the third solution is reduced by about 4.0 dB at a high temperature (50° C.) and a low frequency (20 Hz).

The present disclosure also provides a display device, which may comprise the liquid crystal display panel or the display substrate according to any of the above embodiments. In this way, the flicker problem when the display device displays at a low frequency can be effectively improved. In some embodiments, the display device may be any product or member having a display function, such as a mobile terminal, a television, a display, a notebook computer, a digital photo frame, a navigator, or an electronic paper.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A liquid crystal display panel, comprising:
a first base substrate comprising a display area and a peripheral area surrounding the display area;
a common electrode line located at the peripheral area and configured to provide a common voltage;
a common electrode connected to the common electrode line;
a metal line connected to the common electrode line and connected in parallel with the common electrode, wherein a sheet resistance of the metal line is less than a sheet resistance of the common electrode; and
a signal line, the signal line being one of a data line and a gate line,
wherein the metal line comprises a first portion located at the display area and a third portion located at the display area and connected to the first portion, and the signal line comprises a second portion located at the display area, wherein a width of the first portion is smaller than a width of the third portion and a width of the second portion, and an orthographic projection of the first portion on the first base substrate is completely located within an orthographic projection of the second portion on the first base substrate.

2. The liquid crystal display panel according to claim 1, wherein one area where orthographic projections of one data line and one gate line in the liquid crystal display panel on the first base substrate overlap is located within an orthographic projection of the third portion on the first base substrate.

3. The liquid crystal display panel according to claim 1, wherein the liquid crystal display panel comprises a first group of metal lines and a second group of metal lines crossed with the first group of metal lines, and the first group of metal lines and the second group of metal lines each comprise a plurality of metal lines respectively.

4. The liquid crystal display panel according to claim 3, wherein:
an orthographic projection of a first portion of each of the first group of metal lines located at the display area on the first base substrate is located within an orthographic projection of a second portion of a corresponding data line in the liquid crystal display panel located at the display area on the first base substrate; and
an orthographic projection of a first portion of each of the second group of metal lines located at the display area on the first base substrate is located within an orthographic projection of a second portion of a corresponding gate line in the liquid crystal display panel located at the display area on the first base substrate.

5. The liquid crystal display panel according to claim 4, wherein:
the plurality of metal lines in the first group of metal lines is in one-to-one correspondence with a plurality of data lines in the liquid crystal display panel; and
the plurality of metal lines in the second group of metal lines is in one-to-one correspondence with a plurality of gate lines in the liquid crystal display panel.

6. The liquid crystal display panel according to claim 1, wherein:
the metal line is in contact with the common electrode line; and/or
a surface of the metal line close to the common electrode is in contact with a surface of the common electrode close to the metal line.

7. The liquid crystal display panel according to claim 1, wherein one of the metal line and the common electrode is located between the first base substrate and the other of the metal line and the common electrode.

8. The liquid crystal display panel according to claim 1, wherein:
the sheet resistance of the metal line is greater than 0 and less than or equal to 0.075Ω/□; and/or
a ratio of the sheet resistance of the common electrode to the sheet resistance of the metal line is greater than or equal to 500.

9. The liquid crystal display panel according to claim 1, wherein:
an elastic constant of liquid crystal in the liquid crystal display panel at 50° C. is greater than or equal to 13.5; and/or
an elastic constant of liquid crystal in the liquid crystal display panel at 25° C. is greater than or equal to 17.

10. The liquid crystal display panel according to claim 9, wherein the elastic constant is an average value of a splay elastic constant, a bend elastic constant and a twist elastic constant of the liquid crystal.

11. The liquid crystal display panel according to claim 1, further comprising:
a pixel electrode, wherein a viscosity of a material of the pixel electrode is greater than 3 mPa·s and less than or equal to 5 mPa·s.

12. A display substrate for a liquid crystal display panel, wherein the display substrate is an array substrate, the display substrate comprising:
a first base substrate comprising a display area and a peripheral area surrounding the display area;
a common electrode line located at the peripheral area and configured to provide a common voltage;
a common electrode connected to the common electrode line;
a metal line connected to the common electrode line and connected in parallel with the common electrode, wherein a sheet resistance of the metal line is less than a sheet resistance of the common electrode; and
a signal line, the signal line being one of a data line and a gate line,
wherein the metal line comprises a first portion located at the display area and a third portion located at the display area and connected to the first portion, and the signal line comprises a second portion located at the display area, wherein a width of the first portion is smaller than a width of the third portion and a width of the second portion, and an orthographic projection of the first portion on the first base substrate is completely located within an orthographic projection of the second portion on the first base substrate.

13. The display substrate according to claim 12, wherein the display substrate comprises a first group of metal lines and a second group of metal lines crossed with the first group of metal lines, and the first group of metal lines and the second group of metal lines each comprise a plurality of metal lines respectively, wherein:
an orthographic projection of a first portion of each of the first group of metal lines located at the display area on the first base substrate is located within an orthographic projection of a second portion of a corresponding data line in the liquid crystal display panel located at the display area on the first base substrate; and an orthographic projection of a first portion of each of the second group of metal lines located at the display area on the first base substrate is located within an orthographic projection of a second portion of a corresponding gate line in the liquid crystal display panel located at the display area on the first base substrate.

14. A display device, comprising:

the liquid crystal display panel according to claim 1; or a display substrate for the liquid crystal display panel, wherein the display substrate is an array substrate, the display substrate comprising:

a first base substrate comprising a display area and a peripheral area surrounding the display area;

a common electrode line located at the peripheral area and configured to provide a common voltage;

a common electrode connected to the common electrode line;

a metal line connected to the common electrode line and connected in parallel with the common electrode, wherein a sheet resistance of the metal line is less than a sheet resistance of the common electrode; and a signal line, the signal line being one of a data line and a gate line, wherein the metal line comprises a first portion located at the display area and a third portion located at the display area and connected to the first portion, and the signal line comprises a second portion located at the display area, wherein a width of the first portion is smaller than a width of the third portion and a width of the second portion, and an orthographic projection of the first portion on the first base substrate is completely located within an orthographic projection of the second portion on the first base substrate.

15. A manufacturing method of a liquid crystal display panel, comprising:

providing a first base substrate, wherein the first base substrate comprises a display area and a peripheral area surrounding the display area;

forming a common electrode line located at the peripheral area, wherein the common electrode line is configured to provide a common voltage;

forming a common electrode and a metal line which are connected to the common electrode line respectively, wherein the metal line is connected in parallel with the common electrode, and a sheet resistance of the metal line is less than a sheet resistance of the common electrode; and forming a signal line, the signal line being one of a data line and a gate line, wherein the metal line comprises a first portion located at the display area and a third portion located at the display area and connected to the first portion, and the signal line comprises a second portion located at the display area, wherein a width of the first portion is smaller than a width of the third portion and a width of the second portion, and an orthographic projection of the first portion on the first base substrate is completely located within an orthographic projection of the second portion on the first base substrate.

16. The manufacturing method according to claim 15, further comprising:

forming a first insulating layer in contact with the common electrode on one side of the common electrode away from the first base substrate, wherein a pressure applied during a process of forming the first insulating layer is greater than or equal to 1.2 torr and less than 1.5 torr; and forming a pixel electrode in contact with the first insulating layer on one side of the first insulating layer away from the first base substrate.

17. The manufacturing method according to claim 15, further comprising:

forming a pixel electrode material layer; and etching the pixel electrode material layer with an etching solution to form a pixel electrode, wherein a viscosity of a material of the pixel electrode is greater than 3 mPa·s and less than or equal to 5 mPa·s, a service life of the etching solution is greater than 0 and less than or equal to 5000 mins, and a duration of the etching is greater than or equal to 160 seconds and less than or equal to 180 seconds.

* * * * *